US011460809B2

(12) United States Patent
Kroll et al.

(10) Patent No.: US 11,460,809 B2
(45) Date of Patent: Oct. 4, 2022

(54) METHOD FOR COMPUTING HOLOGRAMS FOR HOLOGRAPHIC RECONSTRUCTION OF TWO-DIMENSIONAL AND/OR THREE-DIMENSIONAL SCENES

(71) Applicant: SEEREAL TECHNOLOGIES S.A., Munsbach (LU)

(72) Inventors: Bo Kroll, London (GB); Norbert Leister, Dresden (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 545 days.

(21) Appl. No.: 15/563,016

(22) PCT Filed: Mar. 29, 2016

(86) PCT No.: PCT/EP2016/056761
§ 371 (c)(1),
(2) Date: Sep. 29, 2017

(87) PCT Pub. No.: WO2016/156287
PCT Pub. Date: Oct. 6, 2016

(65) Prior Publication Data
US 2018/0364643 A1    Dec. 20, 2018

(30) Foreign Application Priority Data
Apr. 1, 2015 (DE) ............ 10 2015 205 873.5

(51) Int. Cl.
*G03H 1/26* (2006.01)
*G03H 1/08* (2006.01)

(52) U.S. Cl.
CPC ............ *G03H 1/26* (2013.01); *G03H 1/0808* (2013.01); *G03H 1/268* (2013.01);
(Continued)

(58) Field of Classification Search
CPC .... G03H 1/26; G03H 2001/0415; G03H 1/02; G03H 1/265; G03H 2223/19;
(Continued)

(56) References Cited

U.S. PATENT DOCUMENTS

| 7,969,633 B2 | 6/2011 | Schwerdtner |
| 9,116,505 B2 | 8/2015 | Schwerdtner |

(Continued)

FOREIGN PATENT DOCUMENTS

| WO | 2006/066919 A1 | 6/2006 |
| WO | 2006/119760 A2 | 11/2006 |

(Continued)

OTHER PUBLICATIONS

International Search Report, dated Mar. 6, 2016, issued in International Application No. PCT/EP2016/056761.
(Continued)

*Primary Examiner* — Collin X Beatty
*Assistant Examiner* — Grant A Gagnon
(74) *Attorney, Agent, or Firm* — Saul Ewing Arnstein & Lehr LLP

(57) ABSTRACT

The invention relates to methods for computing holograms for holographic reconstruction of two-dimensional and/or three-dimensional scenes in a display apparatus, wherein a scene for reconstruction is broken down into object points and the object points are encoded as sub-holograms into at least one spatial light modulation device of the display apparatus. A reconstructed scene is viewed from a region of visibility. At least one virtual plane of the at least one spatial light modulation device is stipulated on the basis of a real plane of the spatial light modulation device. A computation of sub-holograms is performed in the at least one virtual plane of the at least one spatial light modulation device.

23 Claims, 7 Drawing Sheets

(52) U.S. Cl.
CPC . *G03H 2001/0825* (2013.01); *G03H 2210/30* (2013.01); *G03H 2210/441* (2013.01); *G03H 2210/45* (2013.01); *G03H 2210/452* (2013.01)

(58) Field of Classification Search
CPC .. G03H 1/0248; G03H 1/0408; G03H 1/0465; G03H 1/22; G03H 1/268; G03H 2001/0428; G03H 2210/22; G03H 2250/42; G03H 1/0256; G03H 1/16; G03H 1/2249; G03H 1/24; G03H 2001/0413; G03H 2001/2263; G03H 2001/2268; G03H 2001/2675; G03H 2210/20; G03H 2210/54; G03H 2210/562; G03H 2223/12; G03H 1/0011; G03H 1/0236; G03H 1/0244; G03H 1/041; G03H 1/0486; G03H 1/12; G03H 1/202; G03H 1/2286; G03H 1/2645; G03H 1/28; G03H 1/30; G03H 2001/0216; G03H 2001/0417; G03H 2001/0439; G03H 2001/205; G03H 2001/2231; G03H 2001/2273; G03H 2001/2615; G03H 2001/266; G03H 2001/267; G03H 2001/303; G03H 2210/30; G03H 2222/16; G03H 2222/18; G03H 2222/22; G03H 2222/36; G03H 2223/14; G03H 2240/52; G03H 2250/34; G03H 1/028; G03H 1/0406; G03H 1/0866; G03H 1/0891; G03H 1/18; G03H 1/181; G03H 1/2205; G03H 2001/0016; G03H 2001/0033; G03H 2001/0232; G03H 2001/0264; G03H 2001/0284; G03H 2001/0288; G03H 2001/0296; G03H 2001/0447; G03H 2001/0473; G03H 2001/0478; G03H 2001/0497; G03H 2001/0825; G03H 2001/186; G03H 2001/187; G03H 2001/207; G03H 2001/2223; G03H 2001/2265; G03H 2001/2271; G03H 2001/2289; G03H 2001/263; G03H 2001/2655; G03H 2001/2685; G03H 2001/269; G03H 2001/2695; G03H 2001/306; G03H 2210/32; G03H 2210/33; G03H 2210/40; G03H 2210/42; G03H 2210/441; G03H 2210/454; G03H 2210/46; G03H 2210/53; G03H 2210/55; G03H 2210/62; G03H 2222/33; G03H 2222/50; G03H 2222/56; G03H 2223/15; G03H 2223/18; G03H 2225/32; G03H 2225/34; G03H 2227/04; G03H 2230/10; G03H 2240/26; G03H 2250/44; G03H 2260/12; G03H 2260/14; G03H 2260/35; G03H 2270/21; G03H 2270/22; G03H 2270/23; G03H 1/20
USPC .......................................................... 359/22
See application file for complete search history.

(56) References Cited

U.S. PATENT DOCUMENTS

| | | |
|---|---|---|
| 2008/0252950 A1 | 10/2008 | Schwerdtner |
| 2010/0045781 A1 | 2/2010 | Flon et al. |
| 2010/0073744 A1 | 3/2010 | Zschau et al. |
| 2014/0022239 A1 | 1/2014 | Ming |

FOREIGN PATENT DOCUMENTS

| | | |
|---|---|---|
| WO | 2008/025839 A1 | 3/2008 |
| WO | 2008/028829 A1 | 3/2008 |

OTHER PUBLICATIONS

Muffoletto et al., "Numerical techniques for fresnel diffraction in computational holography," Dissertation Graduate Faculty of the Louisiana State University, pp. 1-64 (Nov. 9, 2006) XP007912174.
Xu et al., "Regular effective hologram regions for computer generated holography," Applied Optics, Optical Society of America, vol. 48, No. 34, pp. H196-H202 (Dec. 1, 2009) XP001550273.

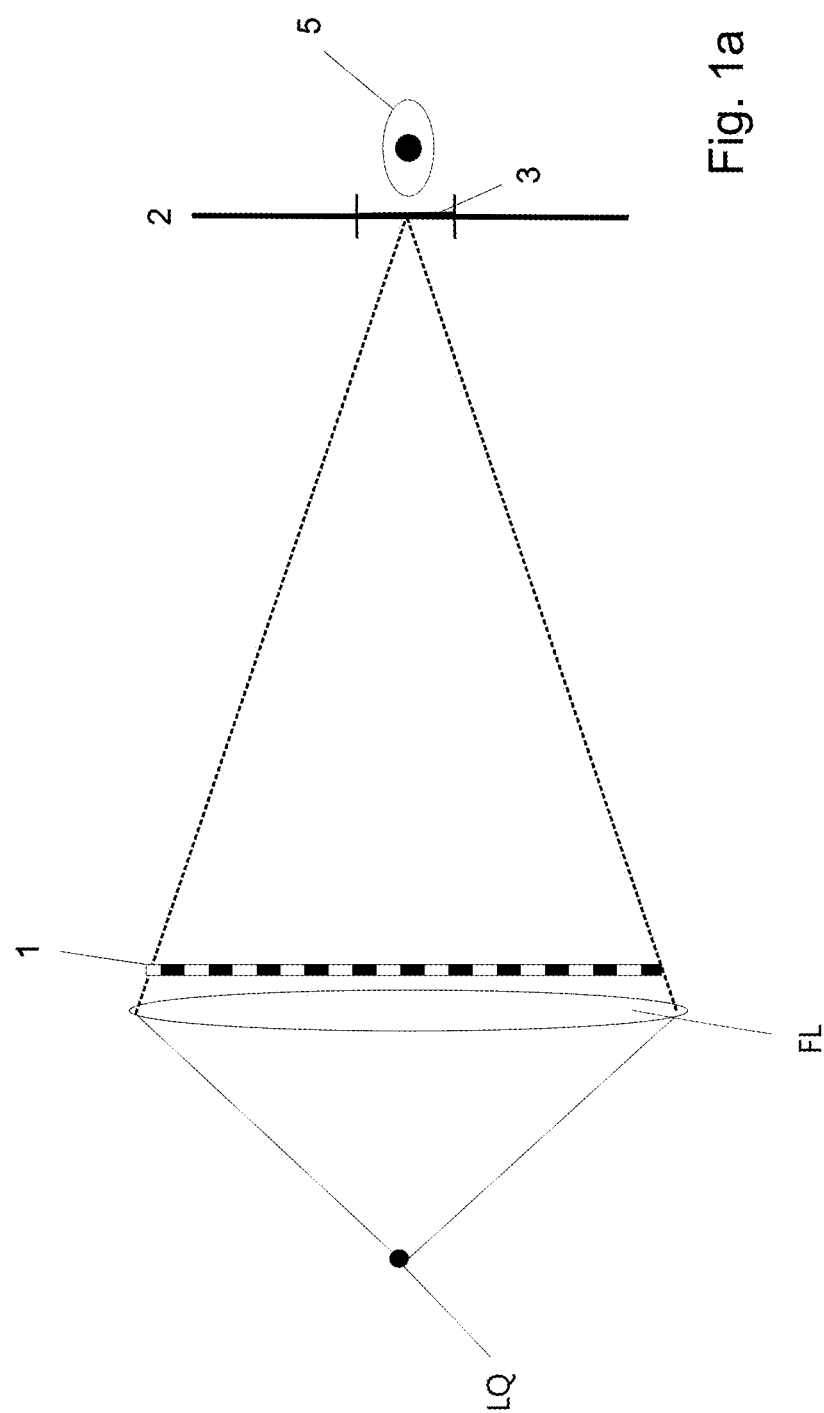

METHOD FOR COMPUTING HOLOGRAMS FOR HOLOGRAPHIC RECONSTRUCTION OF TWO-DIMENSIONAL AND/OR THREE-DIMENSIONAL SCENES

CROSS REFERENCE TO RELATED APPLICATIONS

This application claims the priority of PCT/EP2016/056761, filed on Mar. 29, 2016, which claims priority to German Application No, DE 10 2015 205 873.5, filed on Apr. 1 2015, the entire contents of each of which are incorporated fully herein by reference.

BACKGROUND OF THE INVENTION

The invention relates to a method for calculating holograms for the holographic reconstruction of two-dimensional and/or three-dimensional scenes in a display apparatus, where a scene to be reconstructed is decomposed into object points and the object points are encoded as sub-holograms into at least one spatial light modulator device of the display apparatus, where a reconstructed scene is observed from a visibility region.

The invention also relates to a display apparatus, in particular a holographic display apparatus for the representation of two-dimensional and/or three-dimensional scenes, comprising a spatial light modulator device, where the light modulator device is suitable for carrying out the method.

A method, where the calculation of holograms for a holographic display or a holographic display apparatus is described, is disclosed, for example, in WO 2006/066919 A1, the disclosure of which shall be incorporated completely herein. This method provides that, for calculating holograms, a virtual viewing window is incorporated in an observer plane through which an observer can observe a reconstructed scene when the virtual viewing window coincides with the location of the observer's eye pupil. In contrast to conventional holography, where the reconstruction of preferably three-dimensional (3D) scenes is carried out in a visibility region, which comprises at least both eyes of an observer, this technology involves the limiting of the wave field containing the information on the reconstructed scene to the eye pupils of an observer in an observer plane. The observer will then see the reconstructed scene in a reconstruction space spanned between the viewing window(s) and the display apparatus and possibly extending behind the display apparatus (often referred to as display). This method is disclosed and described, for example, in US 2008/252950 A1, the disclosure of which shall be incorporated completely herein as well.

The method enables the holographic reconstruction of significantly larger three-dimensional scenes, which are encoded in form of holograms in a light modulator (SLM) of a display apparatus (display), where the requirements put on the resolution of the light modulator are significantly lower than the ones put on conventional holography. A further advantage is that the calculation of the corresponding hologram also requires less effort. This is due to, among others, the fact that the information on an object point of the three-dimensional scene is to be encoded only in one region of the display apparatus, said region resulting from the projection of the viewing window over an object point to be displayed onto the display apparatus or the light modulator, the region of the display apparatus is referred to as sub-hologram.

A method for calculating such viewing window-based holograms is illustrated in U.S. Pat. No. 7,969,633, the disclosure of which shall be incorporated completely herein as well. The method is carried out substantially in such a way that a three-dimensional scene is decomposed into sectional planes at sufficiently short distances, in which the object points are arranged having sufficient resolution as well. The sectional planes are then transformed to a virtual viewing window in a reference plane by means of a first integral transformation and are added up in a region of the virtual viewing window. This generally complex-valued wave field is then transformed to the plane of the light modulator by means of a second integral transformation and is encoded therein in form of a generally also complex-valued hologram. The advantage of this method is that only the information in the hologram is encoded that originates from the region of the viewing window and that needs to enter only the viewing window during the reconstruction of the hologram.

The calculation and encoding of the viewing window-based holograms can, however, be done in a different way, too. In the following method, the three-dimensional scene is also decomposed computationally into object points. Sub-holograms will then be calculated in form of lens functions for the individual object points, and they are displayed directly on the light modulator and are added up. The size and position of the sub-holograms on the light modulator result from a projection of the viewing window over the corresponding object point onto the light modulator. This method is described, for example, in WO 2008/025839 A1, the disclosure of which shall be incorporated herein completely as well.

The computational effort required for any of the above methods varies depending on the number of sectional planes and the number of object points.

For the method according to U.S. Pat. No. 7,969,633, the computational effort increases approximately linearly with the number of sectional planes used. To a certain extent, the choice of sectional planes is arbitrary. However, it is usually desired to give an observer in the viewing window a continuous impression of depth of the preferably three-dimensional scene. Therefore, the distances of the sectional planes are to be chosen so small that the eye cannot resolve the difference between adjacent planes. This requires a minimum number of sectional planes for a given three-dimensional scene.

For the method according to WO 2008/025839 A1, the computational effort increases with the number of object points, the density of which is, however, also to be chosen so that a continuous impression of the reconstructed scene is created.

In particular for a three-dimensional scene that extends over a larger depth range and would require many sectional planes according to the method according to U.S. Pat. No. 7,969,633, the method according to WO 2008/025839 A1 is more advantageous with respect to the computational effort needed. The method according to U.S. Pat. No. 7,969,633 may, however, be advantageous for a large number of object points distributed over only very few sectional planes.

For the method according to WO 2008/025839 A1, the computational effort, however, also highly depends on the position of the three-dimensional scene in regard to the position of the light modulator and that of the viewing window, since this has an influence particularly on the size of the sub-holograms for the individual object points.

Holographic displays (display apparatuses) having a virtual viewing window have also been described, for example, in WO 2006/119760 A2, where the observer does not directly see a light modulator but instead the enlarged image of the light modulator on a screen. In this case, the computational effort required for calculating the hologram depends on the position of the three-dimensional scene in regard to the image of the light modulator. The observer would see an enlarged image of a light modulator also in a holographic head-mounted display (holo HMD), with the computational effort also depending on the position of the three-dimensional scene in regard to the image of the light modulator.

Head-mounted displays (HMDs) are display devices worn, for example, on the head of an observer/user, similarly to the use of glasses or a helmet (helmet-mounted display). They can be configured for one eye of an observer (monocular HMD) or for both eyes of an observer (binocular HMD). In addition, stationary or transportable display devices can be configured in a similar way such that the observer using optical magnifying devices near the eyes (eyepiece) can observe the enlarged image of at least one display or the enlarged reconstruction of a three-dimensional scene reconstructed by means of a display device. Hereinafter, such a holographic display device configured as an electronic peep box will be referred to as a hocular.

Generally, if, for example, a three-dimensional scene consisting of only a single object point is to be reconstructed completely, complex values would have to be written in for this object point into the light modulator at the location of the sub-hologram. In a preferred embodiment, the absolute value of the complex value, that is, the amplitude, is near-constant throughout the extension of the sub-hologram and its height depends on the axial distance of the object point to the light modulator or to the screen and on the intensity of the object point. However, the following description shall not be limited to the case of an amplitude that is constant throughout the extension of the sub-hologram, but it may incorporate other options as well. The phase distribution of the complex values in the region of the sub-holograms corresponds approximately to the function of a lens having a focal length that may depend also on the combination with other focusing elements found in the display apparatus, such as a field lens. The focal length of the lens function of the sub-hologram is chosen preferably such that a focal point is located in the individual object point. However, the following description shall not be limited to certain lens functions but may incorporate other phase values in the sub-hologram. Outside the sub-hologram, the amplitude of 0 (zero) would have to be written in for this object point into the light modulator. Only the pixels of the light modulator having full transmission found within the sub-hologram would thus contribute to the reconstruction of each object point.

A computationally intensive step in the hologram calculation is the conversion of the phase of a lens function of a sub-hologram into real part and imaginary part in order to add up several sub-holograms. For, on average, larger sub-holograms, this calculation step is to be carried out more often.

A reproduction of the same three-dimensional scene may, in principle, be carried out in holographic display apparatuses with various parameters, such as the size of the display apparatus or the distance of the display apparatus to the observer.

Using a small-size light modulator with small modulation elements (pixels) and positioned at a small distance from an observer, a viewing window or a visibility region of approximately the same size and a frustrum (a cone extending from the edges of the viewing window/visibility region to the edges of the light modulator and beyond) of the same size can be generated as if using a light modulator of a larger size having the same number of larger modulation elements and positioned at a greater distance from an observer.

For example, a 20-inch display (display apparatus) positioned at a distance of two meters from an observer and having a pixel pitch (the pitch of the modulation element) of 90 μm would be approximately equal to a 4-inch display (display apparatus) positioned at a distance of 40 cm from an observer and having a pixel pitch of 18 μm with regard to the size of the viewing window/visibility region and the frustrum thus generated. The maximum possible size xvw of a visibility region/virtual viewing window is obtained, for example, for blue light of a wavelength λ=475 nm, in both cases (20-inch display and 4-inch display) according to the formula $$x_{vw\_max} = \lambda z_{lm}/p_{lm}$$

with $z_{lm}$, the distance of the light modulator from the visibility region/virtual viewing window, and $p_{lm}$, the pixel pitch, of approximately 10.5 mm. This applies in either the horizontal and/or the vertical direction since the size of the visibility region is generally two-dimensional.

The size of the visibility region or that of the virtual viewing window may be chosen to be smaller. In the general case, $$x_{vw} = a\lambda z_{lm}/p_{lm}$$

with a factor a<=1. In the equations mentioned hereinafter, there would additionally be the factor a in this case. For a better overview, the factor a will be omitted in the following embodiment. However, the following description can also apply to cases where a<1. In general, however, for a holographic display device involving detecting the eye position of at least one observer and tracking the visibility region/virtual viewing window to the eye position, a size of the visibility region/virtual viewing window of 10 mm or more is required to compensate for inaccuracies in the eye position detection and for temporary delays in the tracking of the visibility region/virtual viewing window.

However, the distance of the display apparatus to an observer influences the calculation of the hologram to be encoded into the light modulator.

According to WO 2008/025839 A1, the size of a sub-hologram would be calculated using the intercept theorem in a preferred embodiment.

If $z_{point}$ is the distance of an object point to the viewing window/visibility region and $z_{lm}$ is the distance of the light modulator to the viewing window/visibility region as already described, the size of the sub-hologram would be obtained from of a spatial extent $x_{sh}$ of $$x_{sh} = |x_{vw}(z_{lm} - z_{point})/z_{point}|.$$

FIGS. 1 and 2 show a schematic drawing of a three-dimensional scene, as indicated only by two object points, in a frustum in a fixed position and a fixed distance to an observer. FIGS. 1 and 2 show a schematic drawing of only the light modulator or the light modulator device. Generally, the holographic display apparatus, however, comprises further components, such as an illumination device (backlight) and a field lens.

In FIG. 1, the light modulator device (SLM) has a great distance to an observer. As can be seen in the figure, in absolute terms sub-holograms small in size result in this example. Due to the comparably large pixel pitch of the light modulator device, these sub-holograms thus extend over only few modulation elements (pixels) of the light modulator device. This is particularly advantageous regarding the computational effort required for the calculating and coherent adding of the sub-holograms.

Regarding FIG. 1, a display apparatus smaller in size and comprising smaller modulator elements is shown in FIG. 2, where the display apparatus is located closer to an observer's eye. In this example, the sub-holograms become larger for the same object points in absolute terms. Since here the light modulator device also comprises smaller modulation elements than those in FIG. 1, the sub-holograms extend significantly over a larger number of modulation elements than those in FIG. 1. The effort required to calculate the holograms from the preferably three-dimensional scene is thus greater in FIG. 2.

In practical cases, however, the distance of a display apparatus to an observer depends on the application and is, therefore, cannot be freely selected. A tablet or notebook display, for example, would have a smaller distance to an observer than a television would do.

SUMMARY OF THE INVENTION

Therefore, the object of the present invention is to provide a method that can be used to reduce the computational effort required for the calculation of holograms of a two-dimensional and/or three-dimensional scene. In particular, the computational effort for different positions of the light modulator device with respect to an observer and the scene to be reconstructed shall be reduced. This shall, in particular, be achieved without or with only very few restrictions with regard to the visible lateral resolution and the visible depth resolution of the reconstructed scene.

This object is achieved according to the invention by means of a method according to claim 1.

The method according to the invention serves to calculate holograms for the holographic reconstruction of two-dimensional and/or three-dimensional scenes in a display apparatus (display). The scene to be reconstructed is decomposed into object points, where the object points are encoded as sub-holograms into at least one spatial light modulator device of the display apparatus. The reconstructed scene can then be observed from a visibility region. At least one virtual plane of the at least one spatial light modulator device is determined based on a real or physical plane of the spatial light modulator device. Then a calculation of sub-holograms in the at least one virtual plane of the at least one spatial light modulator device is carried out.

According to the present invention, the term 'plane of the spatial light modulator device' or 'position of the spatial light modulator device' shall be understood in such a general manner that this term can include or shall include the plane or position of the physically available spatial light modulator device in a direct-view display or the plane or position of a physical or virtual image of the spatial light modulator device seen by an observer in a projection display, a head-mounted display (HMD) or a hocular. In contrast, the term 'virtual plane of the spatial light modulator device' is used such that said plane does not have to match the plane or position of a physically available spatial light modulator device or that of an image of a spatial light modulator device seen by an observer. In other words, by the term 'virtual plane of the spatial light modulator device' shall be meant a physically non-available or an imaginary or apparent plane of the spatial light modulator device or a plane of the spatial light modulator device that is virtually shifted to a predetermined location.

According to the invention, a method is proposed, where a calculation of sub-holograms in a virtual, physically non-available or imaginary plane of a spatial light modulator device is carried out in analogy to a single-parallax encoding or a full-parallax encoding as well. Subsequently, an integral transformation could be carried out into a visibility region each and from there into the real or physical plane of the spatial light modulator device.

In this respect, the following embodiments will be distinguished:
- a one-dimensional integral transformation in the case of a single-parallax encoding
- a two-dimensional integral transformation in the case of a single-parallax encoding
- a two-dimensional integral transformation in the case of a full-parallax encoding.

The integral transformation is preferably a Fresnel transformation. However, a Fourier transformation may also be used depending on the application.

Such a calculation method is of particular advantage since holograms can thus be calculated easily, irrespective of the size of the individual sub-holograms, which vary with respect to the position of the object points and the position of the virtual plane of the spatial light modulator device.

By means of the method according to the invention, a hologram is obtained, which corresponds approximately to the hologram that, according to the prior art, would be generated in a direct calculation—thus without using the method proposed according to the invention—preferably by an encoding in at least one virtual plane of the at least one spatial light modulator device and, if required, subsequent transformations into the visibility region and from there into the real or physical plane of the at least one light modulator device. The resulting hologram is then written in or encoded into the real or physical spatial light modulator device.

Although, compared to the conventional calculation of state-of-the-art computer-generated holograms, the method according to the invention could require two additional integral transformations for each virtual plane of the spatial light modulator device. On the other hand, for a large number of object points, the computational time savings, and the savings when adding up the individual sub-holograms can be more important than the two additional integral transformation, which are carried out only once for the entire hologram.

Below, different alternatives will be mentioned, which can be used to further develop the method according to the invention advantageously.

In an advantageous first alternative, the method according to the invention can be further developed in that, in the at least one virtual plane of the at least one spatial light modulator device, the object points of the scene to be reconstructed are calculated as sub-holograms, the calculated sub-holograms of the at least one virtual plane of the at least one spatial light modulator device are transformed by means of an integral transformation into the visibility region and are added up therein, and the summed sub-holograms are transformed by means of a further integral transformation from the visibility region into the physical plane of the at least one spatial light modulator device and are written in therein as a hologram.

In an advantageous second alternative, the method according to the invention can be further developed in that, in the at least one virtual plane of the at least one spatial light modulator device, the object points of the scene to be reconstructed are calculated as sub-holograms and the sub-holograms are added up in the at least one virtual plane, the summed sub-holograms of the at least one virtual plane of the at least one spatial light modulator device are transformed by means of an integral transformation into the visibility region and are transformed from the visibility region into the physical plane of the at least one spatial light modulator device by means of a further integral transformation and are written in therein as a hologram.

In a further advantageous embodiment, the second alternative of the method according to the invention can be further developed in that, when at least two virtual planes of the at least one spatial light modulator device are determined, one of these virtual planes is each assigned to the object points of the scene to be reconstructed, and the object points are calculated as sub-holograms in the virtual plane assigned to them and, the sub-holograms of the object points assigned to the virtual plane are added up in each virtual plane, the summed sub-holograms are transformed from the at least two virtual planes into the visibility region by means of an integral transformation, the transforms of the at least two virtual planes are added up in the visibility region, and the total result of the summed transforms is transformed from the visibility region into the physical plane of the at least one spatial light modulator device by means of a further integral transformation and is written in therein as a hologram.

The second alternative may also be further developed advantageously in that, when at least two virtual planes of the at least one spatial light modulator device are determined, one of these virtual planes is each assigned to the object points of the scene to be reconstructed, and the object points are calculated as sub-holograms in the virtual plane assigned to them, and the sub-holograms of the object points assigned to the virtual plane are added up in each virtual plane, the summed sub-holograms are transformed from the at least two virtual planes into the visibility region by means of an integral transformation for each of the at least two virtual planes the corresponding transform is transformed from the visibility region into the physical plane of the at least one spatial light modulator device by means of a further integral transformation, the transforms of the at least two virtual planes are added up in the physical plane of the at least one spatial light modulator device, and the total result of the summed transformed sub-holograms is written in therein as a hologram.

In all disclosed alternatives of the method according to the invention, the sub-holograms can be written in into the spatial light modulator device as a complex-valued hologram or in form of a hologram encoding.

Accordingly, it can advantageously be provided that the position of the virtual plane of the spatial light modulator device is chosen such that the resulting sub-holograms have a small or minimum size, as described further below in more detail.

For a predetermined, preferably three-dimensional, scene to be reconstructed, the position of the virtual plane of the spatial light modulator device can be chosen such that the sub-holograms to be calculated become, on average, smaller in size—i.e., have a smaller area—than is the case for the actual position of the physical plane of the spatial light modulator device. This advantage outweighs the effort required for the additional transformations, particularly if there are several virtual planes of the spatial light modulator device.

Besides a full-parallax calculation of the sub-holograms or the holograms a single-parallax calculation can also be used. Herein, for example, the sub-hologram of an object point is calculated and encoded not in form of a two-dimensional spherical lens (full-parallax) but in form of a cylindrical lens.

For the method described in U.S. Pat. No. 7,969,633, this means that the decomposition of the scene into object points and the division into sectional planes are carried out in the same way as in a full-parallax encoding, however, in contrast to full-parallax encoding, a possible transformation may be carried out into an observer plane or into a visibility region and into an object plane in form of a one-dimensional integral transformation, such as a one-dimensional Fourier transformation.

For the method according to WO 2008/025839 A1, where the sub-holograms for the object points are calculated directly, this means that sub-holograms comprise only one line with horizontal encoding or one row with vertical encoding.

The lens function of the sub-holograms will then be calculated such that light is focused to the position of the object points only in one dimension (horizontal or vertical).

The single-parallax encoding has the advantage that, in the reconstruction in one dimension (horizontal or vertical), a sharp focal point of the object point in correspondence with the parallax information, which the brain receives from both eyes of an observer, is generated. Therefore, in contrast to a stereoscopic display apparatus or display, there is no conflict between parallax information and focus information (accommodation-vergence conflict). Furthermore, as compared to holograms with full-parallax encoding, the single-parallax encoding has advantages with respect to the requirements put on the computational effort and the hardware, as for example, the size and number of the modulation elements on a display apparatus.

On the other hand, holograms with single-parallax encoding as compared to holograms with full-parallax encoding have the disadvantage that the visible resolution in the direction perpendicular to the holographic encoding can be reduced, in particular for object points placed far away from the plane of the spatial light modulator device, as there is no sharp focal point in this direction in the object plane, but a perceptible smearing of the object point in the reconstruction may be generated under some circumstances. The depth range, in which a two-dimensional and/or three-dimensional scene with a maximum resolution is visible, can thus be limited. This effect is particularly apparent when the distance between the display apparatus and an observer becomes small.

Here, the term 'visibility region' shall preferably be understood as a region in the observer plane that is virtually available and that defines a kind of viewing window. If the eyes, thus, at least one eye of an observer, are located in the visibility region, the observer can observe the reconstructed scene.

Further advantageous embodiments and further developments of the invention are defined in the dependent claims.

In a particular embodiment of the invention, advantageously a single-parallax encoding is used for calculating the sub-holograms. A possible integral transformation into a visibility region and from this into the physical plane of the spatial light modulator device, however, is carried out as a two-dimensional transformation.

This embodiment provides that the position of the at least one virtual plane of the spatial light modulator device is selected within the depth range of the scene to be reconstructed, where said depth range of the scene to be reconstructed is delimited by the object point having the smallest distance to the visibility region and the object point having the greatest distance to the visibility region.

In this case, the position of the at least one virtual plane is chosen such that the visible resolution during the reconstruction of the scene does not fall below a given value. In other words, the position of the virtual plane of the spatial light modulator device, with respect to the depth range of the scene to be reconstructed, is adjusted or determined such that, if any, only slight degradations in the visible resolution of the scene would result.

In particular, this method can be used advantageously for a physical spatial light modulator device (SLM) located at a smaller distance to an observer and a virtual plane of the spatial light modulator device having a greater distance to an observer than the physical spatial light modulator device, as the usable depth range with full resolution increases for a single-parallax encoding with the distance of the spatial light modulator device to the observer.

For example, the physical spatial light modulator device is located 65 cm away from an observer, and the scene to be reconstructed extends between 1.5 m and 17 m from the observer. For the virtual plane of the spatial light modulator device, for example, a distance of 2.5 m from the observer is then chosen.

Furthermore, it can advantageously be provided that the scene to be reconstructed is decomposed into at least two depth range sections, where each virtual plane of the spatial light modulator device is assigned to the at least two depth range sections. This means that the scene to be reconstructed can be calculated by separating into several depth range sections each assigned to a virtual plane in addition to the procedure mentioned above.

Furthermore, the number of the virtual planes is determined such that, for the entire depth range to be displayed, only slight, if any, degradations result with regard to the visible resolution of the reconstructed scene.

This approach, if the depth range of the scene to be reconstructed is as large in its size that not even a single suitable virtual plane of the spatial light modulator device for which a three-dimensional (3D) scene without degradation of the visible resolution can be displayed can be found, it is advantageous and practical to provide and use several virtual planes. In this case, the scene to be reconstructed is decomposed into several, that is, at least two depth range sections, each of which is assigned to one of these virtual planes of the spatial light modulator device. In analogy to a single-parallax encoding, sub-holograms are calculated for the respective virtual planes of the spatial light modulator device in the individual depth range sections.

In this case, one virtual plane of the virtual planes assigned to the at least two depth range sections of the spatial light modulator device can also coincide with the physical plane of the spatial light modulator device.

Subsequently, in a possible procedure, the sub-holograms calculated in relation to the object points located in the individual depth range sections in the virtual plane assigned to the respective depth range section, however not the sub-holograms of the physical plane of the spatial light modulator device, could be transformed into the observer plane or into the visibility region, be added up therein and be transformed from the observer plane or the visibility region into the physical plane of the light modulator device. Alternatively, the sub-holograms of the individual depth range sections could also be added up before being transformed into the visibility region.

The adding up of the sub-holograms calculated for the physical plane of the light modulator device can be carried out advantageously either in this physical plane or in the observer plane or in the plane of the visibility region. In other words, the sub-hologram from the depth range section, which has been calculated directly in the physical plane of the light modulator device, can be chosen to be added up to the further calculated sub-holograms either in the physical plane or also in the observer plane or in the plane of the visibility region.

As an example of a procedure of the method according to the invention, the physical plane of the light modulator device can be located at a distance of 65 cm from an observer, where a three-dimensional scene to be reconstructed shall extend at a distance of between 0.5 m and 17 m from the observer. The scene to be reconstructed is therein decomposed into object points, where, for example, three depth range sections are determined. A first depth range section extends at a distance of 1.5 m to 17 m from the observer. All object points located in this depth range section are assigned to a first generated virtual plane of the spatial light modulator device at a distance of 2.5 m to the observer. A second depth range section shall extend at a distance of 0.8 m to 1.5 m to the observer. All object points located in this depth range section are assigned to a second generated virtual plane of the spatial light modulator device, which is determined to be at a distance of 1.0 m to the observer. A third depth range section shall extend at a distance of 0.5 to 0.8 m to the observer. All object points located in this depth range section are now assigned herein to the physical plane of the spatial light modulator device at a distance of 0.65 m to the observer. However, it is also possible to assign the object points located in this depth range section to a further generated virtual plane of the spatial light modulator device, for example, to a virtual plane at 0.60 m.

A pixel pitch (pitch of the modulation elements) for the virtual planes of the spatial light modulator device is advantageously selected such that, with the transformation of the sub-holograms into the observer plane or into the plane of the visibility region, the same size of the visibility region results as with a pixel pitch for the physical plane of the light modulator device. According to the intercept theorem, the quotient of pixel pitch in the virtual plane divided by pixel pitch in the physical plane of the spatial light modulator device acts like the quotient of distance of the virtual plane divided by the distance of the physical plane of the spatial light modulator device to the visibility region/virtual viewing window.

In a further advantageous embodiment of the invention, it can be provided that the individual object points of the scene to be reconstructed are encoded in form of sub-holograms on the physical plane of the spatial light modulator device as a lens element with different focal lengths in the horizontal direction and vertical direction. This means that here the encoding of the sub-holograms for the object points of the scene to be reconstructed on the physical plane of the light modulator device corresponds to a lens with different focal lengths in the horizontal direction and vertical direction.

By chosing the virtual plane(s) of the spatial light modulator device and the calculation of the sub-holograms in analogy to a one-dimensional single-parallax encoding, an object point on the physical plane of the spatial light modulator device is not encoded as a spherical lens but as a lens with different focal lengths in the horizontal direction and vertical direction. In one direction, the focal point is in the actual object plane, in the direction perpendicular to it in the plane of the virtual plane of the spatial light modulator device. If an observer is located with his eye pupil in the visibility region, he can observe the reconstructed two-dimensional and/or three-dimensional scene such as if said scene had been calculated using a single-parallax encoding in the virtual plane of the spatial light modulator device.

Advantageously, the minor computational effort if using a single-parallax encoding is thus also applicable without limitations of the visible resolution of the reconstructed scene or the depth range. The optical reconstruction of the hologram consisting of the sub-holograms is carried out, however, in a way that is common in a full-parallax encoding. The construction of the holographic display apparatus itself, therefore, does not differ or differs only insignificantly from a display apparatus with full-parallax encoding.

The calculation of the sub-holograms in the at least one virtual plane of the spatial light modulator device can advantageously be carried out either by means of a two-dimensional full-parallax encoding or by means of a one-dimensional single-parallax encoding.

Using several virtual planes, it would also be possible to use a two-dimensional full-parallax encoding in at least one virtual plane of the spatial light modulator device and a one-dimensional single-parallax encoding in at least another virtual plane. Preferably, the two-dimensional full-parallax encoding is then used in at least one virtual plane with a small distance to the visibility region, and the one-dimensional single-parallax encoding is used in at least one plane having a greater distance to the visibility region.

As an alternative procedure of the method according to the invention, it is also possible to carry out a conventional calculation of sub-holograms by means of a full-parallax encoding in at least one virtual plane of the spatial light modulator device. The results of these sub-hologram calculations are then transformed into the observer plane or into the visibility region and are added up there to obtain an entire hologram. Subsequently, the result of the entire hologram is transformed into the physical plane of the spatial light modulator device.

The adding up of the sub-holograms calculated for the physical plane of the light modulator device can be carried out advantageously in the same way as in the embodiment illustrated above either in this physical plane or in the observer plane or in the plane of the visibility region.

Also here in this alternative method, the scene to be reconstructed is decomposed into object points and depth range sections are determined. The object points in a depth range section are each assigned to a virtual plane of the spatial light modulator device. For this virtual plane of the spatial light modulator device, sub-holograms are then calculated.

The calculation, however, is more complex than in the embodiments of the method illustrated so far. However, the result of the entire hologram then corresponds to that of a continuous full-parallax encoding without limitations.

In this embodiment, the choice of the number and position of the virtual planes of the spatial light modulator device is no longer made based on the object to avoid limitations of the visible resolution because such limitations do not arise, but based on the object to limit the computational effort by decreasing the size of the sub-holograms.

In a further embodiment of the method according to the invention, it is also possible to carry out a conventional calculation of sub-holograms by means of a single-parallax encoding in at least one virtual plane of the spatial light modulator device and configure a possible integral transformation as a one-dimensional transformation as well.

In this embodiment, the choice of the number and position of the virtual planes is not made either based on the object to avoid limitations of the visible resolution. The same limitations as those in a conventional calculation of holograms with single-parallax encoding apply here. Again, the choice of the number and position of the virtual planes of the spatial light modulator device is made based on the object to limit the computational effort by decreasing the size of the sub-holograms. In other words, it may advantageously be provided that, depending on the depth range of the scene to be reconstructed, the number of the virtual planes of the spatial light modulator device as well as the distance of said virtual planes of the spatial light modulator device to the visibility region are selected such that the size in form of a number of modulator elements of the sub-holograms to be calculated for the scene to be reconstructed does not exceed a given value.

In an advantageous embodiment of the invention, it may furthermore be provided that the distance of the at least one virtual plane of the spatial light modulator device to the scene to be reconstructed is chosen such that the size in form of a number of modulation elements of the sub-holograms to be calculated for the scene to be reconstructed does not exceed a given value. The distance of the at least one virtual plane of the spatial light modulator device to the scene to be reconstructed is thus practically chosen such that the size of the sub-holograms to be calculated for this virtual plane does not exceed a given numerical value. In other words, by choosing a virtual plane of the spatial light modulator device at a close distance to the scene to be reconstructed, the size of the sub-holograms to be calculated is kept advantageously small.

If, from a given size of the visibility region/virtual viewing window, the size in form of a spatial extent of the sub-holograms is calculated using the intercept theorem, $$x_{sh}=|x_{vw}(z_{lm}-z_{point})/z_{point}| \text{ is obtained.}$$

The size in form of a number of modulation elements of the sub-holograms $N_{sh}$ is then obtained by dividing the extent by the pixel pitch and subsequently rounding it off to an integer value $$N_{sh}=(x_{sh}/p_{lm}).$$

To simplify the equations given above, this rounding off is not explicitly written down in the following. However, each $N_{sh}$ shall represent a rounded-off integer value.

This term can be rearranged mathematically (using the above formula for the extent of the visibility region or the virtual viewing window) to $$N_{sh}=(1/z_{point}-1/z_{lm})x_{vw}^2/\lambda.$$

Thus, for a given size of the visibility region/virtual viewing window, the size in form of a number of modulation elements of the sub-holograms depends on $$|1/z_{point}-1/z_{lm}|.$$

The depth range of a three-dimensional scene can be characterized by the distance $z_{point\_min}$ of the object point(s) of the scene to be reconstructed that have the smallest distance to the visibility region and $z_{point\_max}$ of the object point(s) of the scene to be reconstructed that have the greatest distance to the visibility region.

Either the object points having the smallest distance $z_{point\_min}$ or the object points having the greatest distance $z_{point\_max}$ to the visibility region also have the largest sub-holograms in their extent.

For a given depth range at a selectable position—that is, the distance to the visibility region—of $z_{lm\_virt}$ of a single virtual plane of the spatial light modulator device, in a preferred embodiment, if the maximum size in form of a number of modulation elements of the sub-holograms is to be limited, the following is carried out:

$$1/z_{point\_min} - 1/z_{lm\_virt} = 1/z_{lm\_virt} - 1/z_{point\_max}.$$

The virtual plane of the spatial light modulator device is thus positioned within the depth range of the three-dimensional scene; that means in such a way that, for the object points having the smallest distance to the visibility region, the size of the sub-hologram in form of a number of modulation elements is identical with the size of the sub-hologram for the object points having the greatest distance to the visibility region.

It is $$z_{lm\_virt} = 2/(1/z_{point\_min} + 1/z_{point\_max}).$$

For a depth range of a three-dimensional scene extending from a distance of 50 cm from the visibility region to infinity ($1/z_{point\_max} = 0$), for example, the maximum size of the sub-holograms in form of a number of modulation elements would be most favorable if the virtual plane of the spatial light modulator device were positioned at a distance of 1 m (i.e., 2×50 cm) from the visibility region.

If however, the three-dimensional scene, for example, extends at a distance of 1.5 m to 17 m from the visibility region, the virtual plane of the spatial light modulator device would be positioned at approximately 2.76 m, that is, at 2×1/(1/1.5+1/17) m.

In the example of the depth range of 0.5 m to infinity and in the example of the blue wavelength of 475 nm and the size of the visibility region of 10.5 mm, the pixel pitch of the virtual plane of the spatial light modulator device would be approximately 45 µm.

In this example, a sub-hologram of an object point at a distance of 50 cm from the visibility region as well as a sub-hologram of an object point at infinity would each have a size in form of a number of 234 modulation elements in one dimension (for example, horizontal).

With a full-parallax encoding and in the case of modulation elements rectangular/square in shape, the total number of modulation elements would be 234×234.

In this case, the size in form of a number of modulation elements of the sub-holograms to be calculated for the scene to be reconstructed would thus not exceed the value of 234 in the entire depth range.

In a preferred embodiment, the following approach is used when using two virtual planes of the spatial light modulator device:

The depth range of the three-dimensional scene is decomposed into two sub-ranges or depth range sections. The size $z_{point\_med}$ shall represent the border between the two ranges or sections.

For all object points between $z_{point\_min}$ and $z_{point\_med}$, the sub-holograms are calculated in a first virtual plane $z_{lm\_virt1}$, for all points between $z_{point\_med}$ and $z_{point\_max}$, the sub-holograms are calculated in a second virtual plane $z_{lm\_virt2}$.

The border between the depth range sections $z_{point\_med}$ is determined in such a way that a sub-hologram of an object point at this distance from the visibility region has the same size in form of a number of modulation elements in both virtual planes of the spatial light modulator device and that, in addition, a sub-hologram of $z_{point\_min}$ in the first virtual plane of the spatial light modulator device and a sub-hologram of $z_{point\_max}$ in the second virtual plane of the spatial light modulator device also have the same size in form of a number of modulation elements as a sub-hologram of $z_{point\_med}$ in both virtual planes:

$$1/z_{point\_min} - 1/z_{lm\_virt1} = 1/z_{lm\_virt1} - 1/z_{point\_med} =$$
$$1/z_{point\_med} - 1/z_{lm\_virt2} \leq 1/z_{lm\_virt2} - 1/z_{point\_max}.$$

In the example, with a depth range of between 0.5 m and infinity and a visibility region or a viewing window having a size of 10.5 mm, the result is that a first virtual plane of the spatial light modulator device with a pixel pitch of 30 µm is provided at $z_{lm\_virt1} = 0.67$ m and a second virtual plane of the spatial light modulator device with a pixel pitch of 90 µm is provided at $z_{lm\_virt2} = 2.0$ m. For $z_{point\_med}$, the result is 1.0 m.

For all object points at a distance of between 0.5 m and 1.0 m from the visibility region, sub-holograms are thus calculated in the first virtual plane of the spatial light modulator device. For all object points at a distance of between 1.0 m and infinity, sub-holograms are calculated in the second virtual plane of the spatial light modulator device. A sub-hologram of an object point at a distance of 0.5 m from the visibility region has a size in form of a number of 117 modulation elements in one dimension in the first virtual plane of the spatial light modulator device. A sub-hologram of an object point at a distance of 1 m from the visibility region also has this size in form of a number of 117 modulation elements in one dimension in both virtual planes of the spatial light modulator device, and a sub-hologram of an object point at infinity has this size in form of a number of 117 modulation elements in the second virtual plane of the spatial light modulator device.

Compared to using a single virtual plane of the spatial light modulator device, the maximum number of modulation elements can be divided in half in a sub-hologram in one dimension, such as, in this example, from 234 to 117.

One of the virtual planes of the spatial light modulator device can also coincide with a physical plane of the spatial light modulator device.

For example, for a computer screen, whose observer's distances are typically in the range of 60-70 cm, a first virtual plane of the spatial light modulator device at 67 cm could coincide with the physical plane of the spatial light modulator device. In this case, an integral transformation would be necessary only for a second virtual plane of the spatial light modulator device at 2 m.

In turn, for a television, a second virtual plane of the spatial light modulator device at 2 m could coincide with the physical plane of the spatial light modulator device.

Alternatively, the procedure could also involve defining a maximum number in form of a number of modulation elements and determining therefrom the number of the virtual planes of the spatial light modulator device that is necessary to achieve this size.

In the above example, a given maximum value of 100 modulation elements with 1 or 2 virtual planes of the spatial light modulator device is still exceeded, so that a third virtual plane of the spatial light modulator device is required.

In a further embodiment of the invention, the number of virtual planes of the spatial light modulator device can advantageously be limited to a given value in order to keep the effort as low as possible for possible additional transformations.

So for example, in the procedure described above involving the same three-dimensional scene having a certain depth range, the maximum number of modulation elements of a sub-hologram would be divided in half if there were two virtual planes of the spatial light modulator device as compared to a single virtual plane. It would be divided into three if there were three virtual planes of the spatial light modulator device compared to one virtual plane. And, it would be divided into four if there were four virtual planes of the spatial light modulator device compared to one virtual plane. The improvement achieved by using additional virtual planes is thus steadily decreasing. When using a fifth virtual plane of the spatial light modulator device, the further improvement from one quarter to one fifth is comparably small.

For each further virtual plane of the spatial light modulator device, however, the number of the integral transformations increases by the number of 2. Normally, the number of virtual planes of the spatial light modulator device would be limited to few, for example, 2 or 4. The present invention, however, is not limited to a given maximum number of virtual planes of the spatial light modulator device.

As the effort for calculating sub-holograms also increases with the number of object points into which a preferably three-dimensional scene is decomposed, but the effort for an integral transformation is independent from the number of object points, the number of virtual planes of the spatial light modulator device may also be determined based on the number of object points such that, for a three-dimensional scene comprising a multitude of object points, more virtual planes of the spatial light modulator device are used and, for a three-dimensional scene comprising few object points, fewer virtual planes of the spatial light modulator device are used.

In another or alternative embodiment of the invention, not the maximum size of the sub-holograms in form of a number of modulation elements is limited, but instead, the average size of the sub-holograms in form of a number of modulation elements is minimized. That means that the distance of the at least one virtual plane of the spatial light modulator device to the visibility region may, depending on the position of all object points of the scene to be reconstructed, be selected such that the average size, preferably averaged over all object points, in form of a number of modulation elements of the sub-holograms to be calculated for the scene to be reconstructed takes a minimum value.

As mentioned before, for a single object point the size of the sub-holograms in form of a number of modulation elements is proportional to the amount of $|1/z_{point}-1/z_{lm\_virt}|$ in one dimension (horizontal or vertical).

In the case of a single-parallax encoding, the total number of modulation elements in a sub-hologram is proportional to this amount.

In the case of a full-parallax encoding, the total number of modulation elements in a sub-hologram is obtained by multiplying the vertical and horizontal modulation elements and is thus proportional to $(1/z_{point}-1/z_{lm\_virt})^2$.

In this embodiment, for a three-dimensional scene, which is decomposed into N object points, the position of a virtual plane of the spatial light modulator device is determined by minimizing the sum either of the expression $|1/z_{point\ i}-1/z_{lm\ virt}|$ with a single-parallax encoding or of the expression $(1/z_{point\ i}-1/z_{lm\ virt})^2$ with a full-parallax encoding over all points $z_{point\ i}$; that is, in this case, the sum is put to zero: $\Sigma i=1 \ldots N|1/z_{point\ i}-1/z_{lm\ virt}|=0$.

It follows that $\Sigma i=1 \ldots N|1/z_{point\ i}=N/z_{lm\ virt}$. A minimizing is carried out in both cases by forming the derivative of the respective sum with respect to $z_{lm\ virt}$ and putting it to 0. For the full-parallax encoding, $\Sigma i=1 \ldots N(1/z_{point\ i}-1/z_{lm\ virt})^2$=Min is calculated. It follows that $\Sigma i=1 \ldots N|1/z_{point\ i}=N/z_{lm\ virt}$. In an example of a scene to be reconstructed that is comprised of only three object points and that is located at distances to the visibility region of $z_{point\ 1}$=0.5 m, $z_{point\ 2}$=0.66 m and of $z_{point\ 3}$=2.0 m, (2+1.5+0.5)/meters=$3/z_{lm\ virt}$ would be obtained and therefrom a distance of the virtual plane of the spatial light modulator device to the visibility region of $z_{lm\ virt}$=0.75 m would result.

For the single-parallax encoding, $\Sigma i=1 \ldots N|1/z_{point\ i}-1/z_{lm\ virt}|$=Min is calculated.

The minimum is achieved if $z_{lm\ virt}$ is chosen such that half of the object points as seen from the visibility region is located in front of the virtual plane of the spatial light modulator device and the other half of the object points is located behind it. In this example of the 3 object points, for a single-parallax encoding, the position of the virtual plane of the spatial light modulator device would be chosen such that said position coincides with the average point of $z_{point\ 2}$=0.66 m.

In the case of an even number of object points, for example of 4 object points and $z_{point\ 4}$=0.95 m in addition to the object points mentioned above, the virtual plane of the spatial light modulator device would be chosen such that it were located anywhere in the range between 0.66 m and 0.95 m, so that $z_{point\ 1}$ and $z_{point\ 2}$ are located in front of the virtual plane and $z_{point\ 3}$ and $z_{point\ 4}$ are located behind it.

The example of 3 or 4 object points shall only illustrate how this distance is chosen. In a practical case, this method would rather be applied to three-dimensional scenes having a multitude of object points—some 1,000 to many millions.

This kind of minimizing the average size of the sub-holograms in form of a number of modulation elements requires an additional step of calculation, in which the position of all object points of the three-dimensional scene is to be taken into account.

Thus, in a further exemplary embodiment, only the depth range in form of the minimum distance $z_{point\_min}$ and of the maximum distance $z_{point\_max}$ is used, and the integral of $z_{point\_min}$ to $z_{point\_max}$ over $|1/z_{point}-1/z_{lm\ virt}|dz_{point}$ is minimized in the case of a single-parallax encoding, or the Integral of $z_{point\_min}$ to $z_{point\_max}$ over $(1/z_{point}-1/z_{lm\ virt})^2 dz_{point}$ is minimized in the case of a full-parallax encoding.

The computational effort for the transformation corresponds to the method described in U.S. Pat. No. 7,969,633 if said method is applied to a preferably three-dimensional scene to be reconstructed that comprises few depth planes. However, advantageously, a large depth range with any fine depth resolution may be used.

Indeed, in the variant of the method according to the invention comprising several virtual planes of the spatial light modulator device, preferably virtual planes of the spatial light modulator device that are arranged at a greater distance from an observer than the physical plane of the spatial light modulator device is are used. Generally speaking, however, in this variant or alternative and, particularly, also in the variant/alternative comprising a full-parallax encoding in the virtual planes of the spatial light modulator device, these virtual planes may also be located at a closer distance to the observer than that of the physical plane of the spatial light modulator device.

In a preferred embodiment of the invention, it may, furthermore, be provided that the position of the at least one virtual plane of the spatial light modulator device is adjusted to the new depth range in the case of a temporal change of the depth range of the scene to be reconstructed.

For example, contents consecutively displayed on the holographic display apparatus (for instance, like a film sequence) may switch between a preferably three-dimensional scene having object points near the visibility region and temporally subsequently a preferably three-dimensional scene having object points far away from the visibility region or a virtual viewing window.

Then, for each single image, the depth range of the scene to be reconstructed would be determined, for example, the object points $z_{point\_min}$ with the minimum distance and $z_{point\_max}$ with the maximum distance to the visibility region, and the position(s) of the at least one virtual plane of the spatial light modulator device would be calculated thereof.

Furthermore, in a further embodiment of the invention, it can advantageously be provided that, when tracking the visibility region in the axial direction and/or the lateral direction according to a detected position of an observer of the reconstructed scene, the number and position of the at least one virtual plane of the spatial light modulator device is adjusted to the new position of the visibility region.

It can be provided that an observer's distance detected by means of an apparatus for detecting the observer's position to the physical plane of the spatial light modulator device onto which the visibility region is tracked is used to determine the number and/or position of the at least one virtual plane of the spatial light modulator device.

Alternatively, also an average or more typically (depending on the application, for example, notebook or television) distance of an observer to the physical plane of the spatial light modulator device can be used.

Advantageously, for the virtual plane of the spatial light modulator device, a position in the frustum can be chosen that is located within the scene to be reconstructed in such a way that, watched by an observer in an observer plane, a number of object points is in front of the virtual plane of the spatial light modulator device and a number of object points is behind it, where the object points nearest the observer should be located not more than half the virtual observer's distance in front of the virtual plane of the spatial light modulator device. The method, however, is not limited to a certain determination of the position of the virtual plane of the spatial light modulator device.

Furthermore, it can advantageously be provided that, particularly for the embodiment of the invention using a single-parallax encoding and a two-dimensional integral transformation, the deviation of the calculated hologram of the scene to be reconstructed by means of the at least one virtual plane of the spatial light modulator device from a hologram directly calculated in the physical plane of the spatial light modulator device for the same scene does not exceed a defined criterion. For example, this criterion is characterized in that the visible resolution of the three-dimensional scene calculated in such a way is worse by a maximum of 20% compared to the resolution of a hologram of the same scene calculated directly in the physical plane of the spatial light modulator device.

In a further advantageous embodiment of the invention, it may be provided that, when using a display apparatus for the representation of two-dimensional and/or three-dimensional scenes in which an image plane of the at least one spatial light modulator device is generated, which acts as a physical plane of the spatial light modulator device, for example, a head-mounted display or hocular, depending on the content of a scene to be reconstructed, at least one virtual plane of the at least one spatial light modulator device is determined according to one of the approaches of the invention described above, for example, in such a way that the maximum size or the average size of the sub-holograms is minimized, the image plane of the spatial light modulator device is shifted such that said image plane coincides with the virtual plane of the spatial light modulator device, the object points of the scene to be reconstructed are calculated as sub-holograms and are added up and written in as a hologram.

For the representation of two- and/or three-dimensional scenes, also a head-mounted display or a hocular could be used. The head-mounted display or hocular comprises an imaging system or a focusing system in such a way that, from the visibility region, an enlarged image of the spatial light modulator device is visible. The imaging system or focusing system can be configured such that the position of the image plane of the spatial light modulator device is variable. The imaging system or focusing system can, for example, comprise at least one element, the focal length of which is configured variably, i.e., it can be varied in a controllable way. In this way it is possible to shift an image plane of the at least one spatial light modulator device. This means that, depending on the content of a scene to be displayed, at least one virtual plane of the spatial light modulator device is determined or set, where said virtual plane is determined in such a way that the sub-holograms of the object points of the scene are configured to have a small area if possible, and thus their calculation is advantageous with respect to the effort. The image/image plane of the spatial light modulator device, which corresponds to the physical plane of the spatial light modulator device in a display apparatus, which is designed as a direct-view display, may then be shifted in such a way that this coincides with the virtual plane of the spatial light modulator device or is identical with it. In this case, if only one virtual plane of the spatial light modulator device is available, the integral transformation can be omitted completely.

Alternatively, the image plane of the at least one spatial light modulator device could also be shifted by slightly changing the physical plane of the spatial light modulator device.

Of course, it would also be possible to provide several virtual planes of the spatial light modulator device in which the image of the spatial light modulator device is shifted in such a way that it coincides with one of these virtual planes. The image of the spatial light modulator device could also be shifted such that it coincides temporarily consecutively with another virtual plane each. By means of the imaging system having a variable focal length, which, for example, may be designed as a diffractive system or refractive system and could thus comprise, for example, at least one lens or at least one mirror, such as an electrowetting lens whose focal length may be varied by controlling the electrical voltage, or a membrane mirror whose radius of curvature is variable, or also a system comprising several lenses in which by changing the distance of the lenses, the focal length of the system is changed, an image of the spatial light modulator device is shifted in such a way that for a two- and/or three-dimensional scene having a given depth range (thus content-based) the size of the sub-holograms may be set in a suitable way with regard to the computational effort.

The method according to the invention can be used by means of a light modulator device, in particular in a display apparatus, preferably in a holographic display apparatus for the representation of two-dimensional and/or three-dimensional scenes, comprising a spatial light modulator device, where the light modulator device is suitable for carrying out the method according to the invention.

Further embodiments of the invention are described in the remaining dependent claims. Below, the invention is illustrated in more detail in principle, using exemplary embodiments explained in more detail by means of the figures. Therein, the principle of the invention is described using a holographic reconstruction with coherent light.

BRIEF DESCRIPTION OF THE DRAWINGS

The Figures Show:

FIGS. 1a, 1b, 1c: different possible embodiments of a display apparatus for the holographic reconstruction of two-dimensional and/or three-dimensional scenes, according to the prior art.

DETAILED DESCRIPTION OF THE INVENTION

Figure 1B:
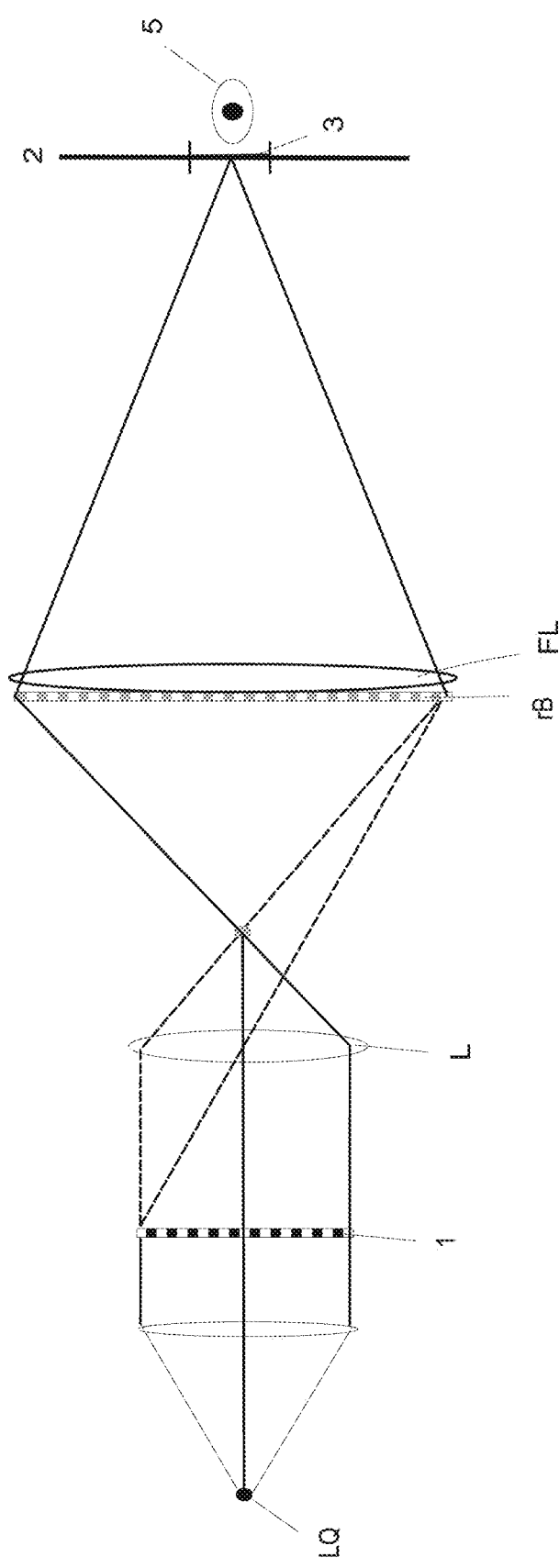

It should be mentioned briefly that the same elements/components have the same reference numerals.

In FIG. 1a, schematically and by way of example, a display apparatus according to the prior art for the holographic reconstruction of two-dimensional and/or three-dimensional scenes is shown.

In this example, the display apparatus comprises a light source LQ, a field lens FL and a spatial light modulator device 1. The light source LQ and the field lens FL are arranged in such a way that, where no hologram is written in into the spatial light modulator device 1, the light emitting by the light source LQ is focused by means of the field lens FL into an observer plane 2 at a distance $z_{lm}$ from the spatial light modulator device 1. If a scene to be reconstructed (not shown here) is decomposed into object points in a suitable way and the object points are encoded into the spatial light modulator device 1 of the display apparatus as sub-holograms, a visibility region 3 or a virtual viewing window is generated at said distance $z_{lm}$ from the spatial light modulator device 1.

In the display apparatus shown, the distance of the field lens FL of the spatial light modulator device 1 is small, that is, significantly smaller than the distance $z_{lm}$ of the spatial light modulator device 1 to the visibility region 3.

FIG. 1a shows a field lens having a fixed focal length. In general, the field lens can particularly also be designed to have a variable focal length, or the display apparatus can comprise variable focusing elements in addition to the field lens, used to adjust dynamically the distance $z_{lm}$ to a changed overserver's position. The display apparatus can, furthermore, comprise deflecting elements for tracking the visibility region 3 of a laterally changed observer's position.

The display apparatus shown in FIG. 1a is also referred to as a holographic direct-view display.

Compared to FIG. 1a, FIG. 1b also shows a display apparatus according to the prior art, which, however, is referred to as a holographic projection display.

In FIG. 1b, several optical elements L, herein shown as lenses, are arranged in the display apparatus such that, first, one usually enlarged real image rB of a spatial light modulator device 1 is generated.

Using a field lens FL, which is arranged very close to the real image rB of the spatial light modulator device 1, furthermore, light of a light source LQ is focused into an observer plane 2.

Then, the decomposing of a scene to be reconstructed into object points and the encoding of the object points into the spatial light modulator device 1 of the display apparatus as sub-holograms can be carried out in such a way as if there were indeed a materially available spatial light modulator device at the location of the real image rB of the spatial light modulator device 1.

Figure 1C:
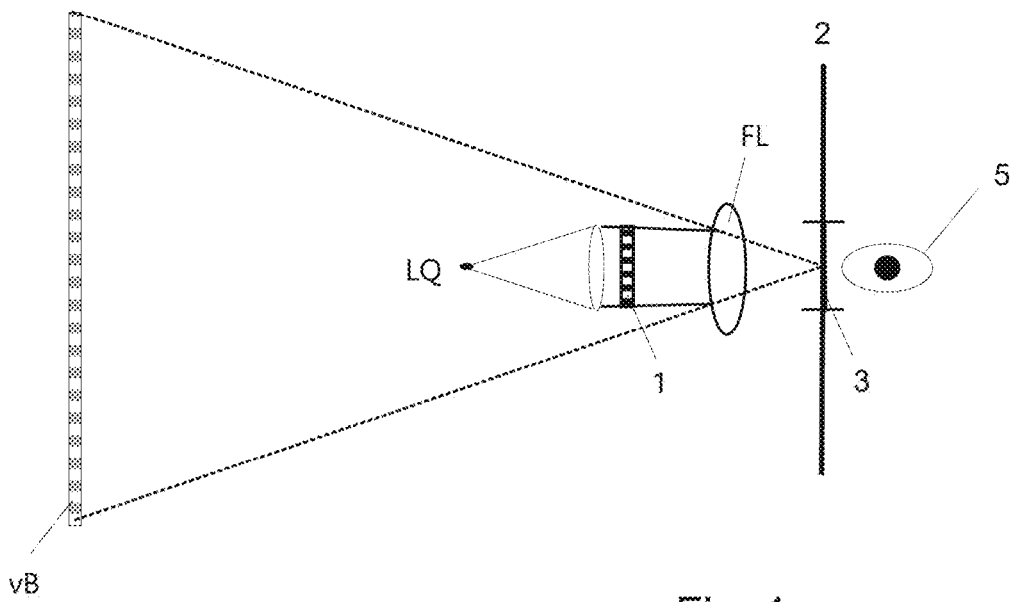

FIG. 1c shows a display apparatus in which also a field lens FL focuses light of a light source LQ into an observer plane 2.

In this exemplary embodiment of a display apparatus, a spatial light modulator device 1 is located at a position such that the distance between the spatial light modulator device 1 and the field lens FL is similar in size to the distance between the field lens FL and the observer plane 2.

The distance between the field lens FL and the observer plane 2 corresponds to, for example, the focal length of the field lens FL. The distance between the spatial light modulator device 1 and the field lens FL is approximately as large as but smaller than the focal length of the field lens.

In this case, a usually enlarged virtual image vB of the spatial light modulator device 1 is generated.

In turn, the decomposing of a scene to be reconstructed into object points and the encoding of the object points into the spatial light modulator device 1 of the display apparatus as sub-holograms can then be carried out as if there were indeed a materially available spatial light modulator device 1 at the location of the virtual image vB of the spatial light modulator device 1.

Such a display apparatus can, for example, be designed as a head-mounted display, where a field lens having a small focal length and a spatial light modulator device small in size are located near the eyes of an observer—for example, used as glasses or as a hocular.

The term 'physical plane of the spatial light modulator device' as used in the description of the invention should be a generic one comprising also image planes of a spatial light modulator device in a display apparatus as illustrated, for example, by FIGS. 1b and 1c.

Figure 2:
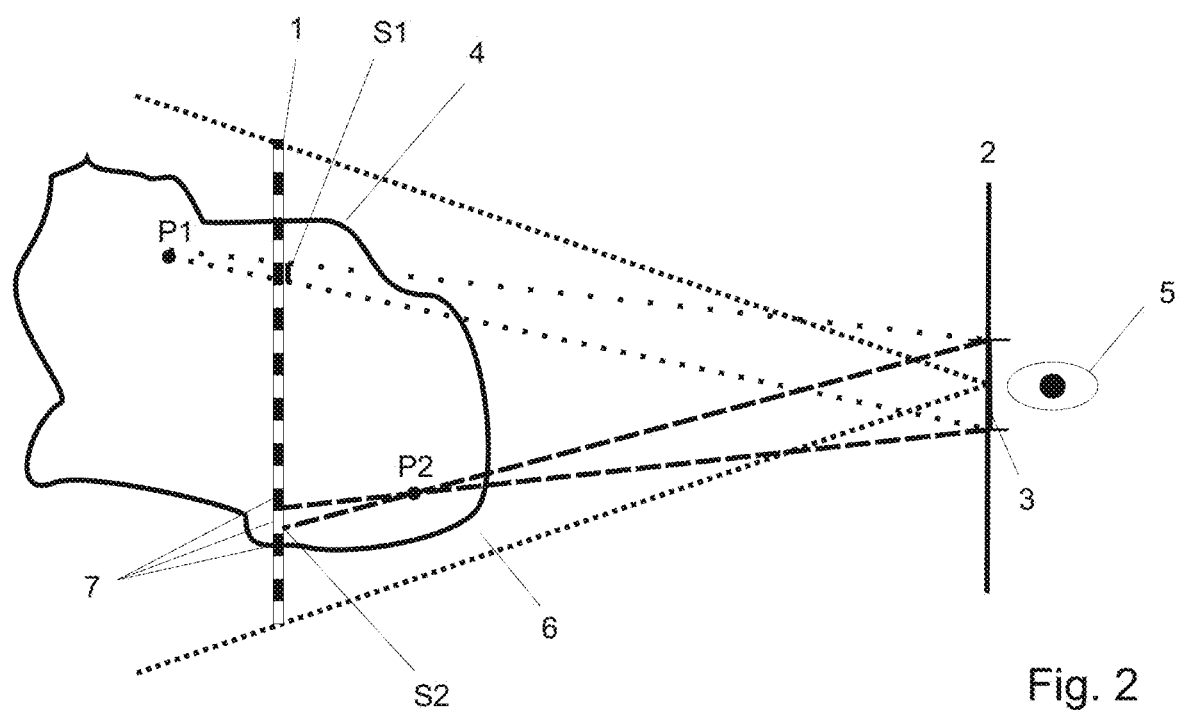
FIG. 2: a schematic drawing of a scene to be reconstructed in a frustum in a defined distance to an observer and to a spatial light modulator device.

FIG. 2 shows in a schematic way a spatial light modulator device 1 according to the present invention. The spatial light modulator device 1 is provided in a holographic display apparatus, where the structure of the holographic display apparatus is not significant for the presentation of the method according to the invention. Usually, as illustrated by the preceding FIGS. 1a to 1c, the holographic display apparatus comprises at least one spatial light modulator device in connection with an illumination device (backlight) and further components, such as, for example, a field lens, deflecting elements etc. To describe the method according to the invention, it is sufficient to describe in more detail only the at least one spatial light modulator device 1 in connection with an observer plane and illustrate it in FIGS. 2 to 5.

Thus, further devices or elements provided in the display apparatus will not be described herein, unless pointed out accordingly.

The spatial light modulator device 1, also referred to as SLM (spatial light modulator), according to FIGS. 2 to 6 can be designed as an amplitude+phase light modulator device, where, of course, other embodiments of the light modulator device are possible, too. However, the embodiment of the spatial light modulator device 1 is of minor importance herein, playing no significant role for the description of the method.

If, however, a comlex value of a hologram is not written in in a single modulation element (pixel) of an amplitude+phase light modulator device but is written in instead using several modulation elements (pixels) of an only phase- or only amplitude-modulating light modulator device, the aforementioned terms 'pixel pitch' and 'number of modulation elements (pixels)' are to be understood so that a modulation element and a pixel pitch each refers to several modulation elements (pixels) of such a light modulator device into which, in total, one complex value is written in.

The spatial light modulator device 1 can be designed as an amplitude+phase light modulator device in form of a sandwich array. The amplitude light modulator device has, for example, a smaller distance (typically <2 mm) from the phase light modulator device.

In this case, the term 'physical plane of the spatial light modulator device' is used preferably such that a central plane is chosen in the sandwich array.

As shown in FIG. 2 and illustrated in the described documents U.S. Pat. No. 7,969,633, WO 2008/025839 A1 and WO 2006/119760 A2 of the applicant, a visibility region 3 is generated in an observer plane 2, through which an observer can watch a reconstructed two-dimensional and/or three-dimensional scene if the observer is in the observer plane 2 and at least one eye 5 coincides with the location of the visibility region 3. The visibility region 3 can be designed as a virtual viewing window. For purposes of illustration, the eye 5 of the observer was shown behind the visibility region 3 in FIGS. 2 and 3. A scene 4 to be reconstructed, herein shown only schematically in dashed lines and by two object points P1 and P2, shall be displayed in a frustum 6 (a truncated pyramidal cone extending from the visibility region 3 to the spatial light modulator device 1 and beyond). Herein, the scene 4 to be reconstructed has a given position and a given distance to an observer.

Figure 3:
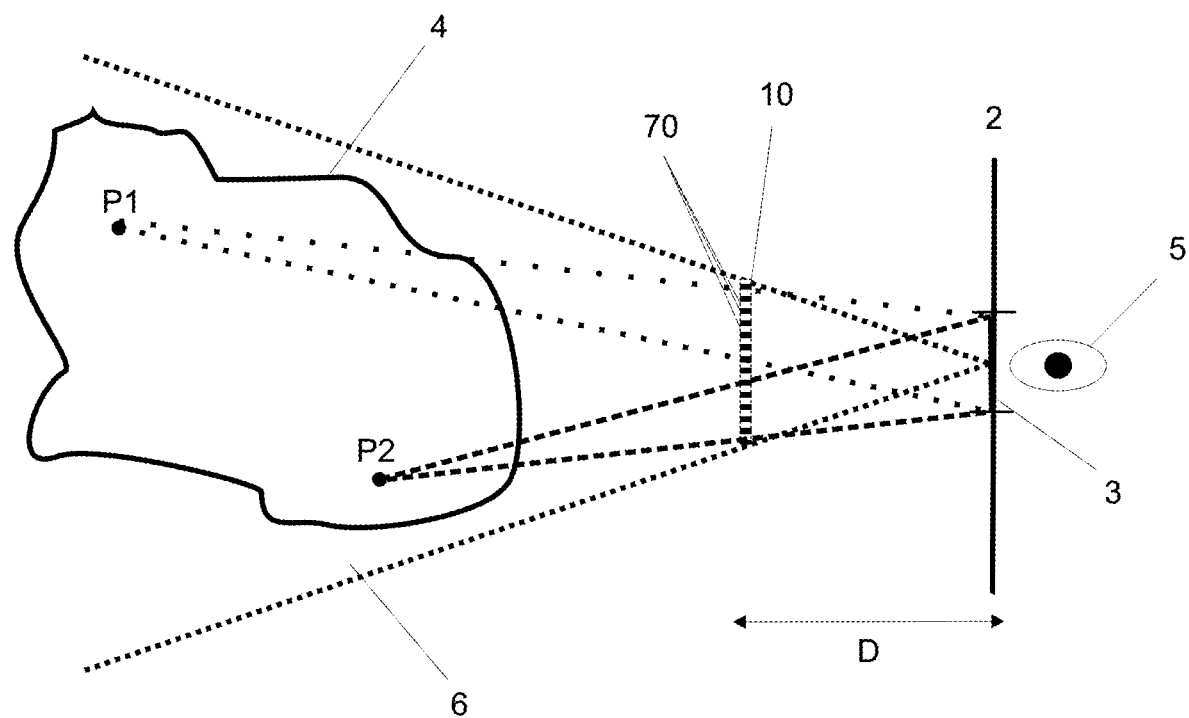
FIG. 3: a schematic drawing of a scene to be reconstructed according to FIG. 1 when using a spatial light modulator device smaller in size.

The spatial light modulator device 1 shown in FIG. 2 is slightly larger in its size and extension and has a greater distance from the visibility region 3 than the one in FIG. 3. By providing beams emanating from the edges of the visibility region 3 through an object point to be reconstructed, for example P2, to the plane of the spatial light modulator device 1, a region—referring to P2, a region S2—can be generated on the light modulator device 1 and is referred to as sub-hologram. In this sub-hologram, the respective object point is defined so that for this object point only a defined region S2 has to be calculated, which will then be encoded into the spatial light modulator device 1. The same applies to the object point P1 defined by a region S1 referred to as sub-hologram on the spatial light modulator device 1.

Here, in absolute terms, small sub-holograms S1 and S2 are generated on the spatial light modulator device according to FIG. 2. Due to the comparatively large pixel pitch of the spatial light modulator device 1 provided in this exemplary embodiment, these sub-holograms extend only over few modulation elements 7, also referred to as pixels (as already explained above), of the spatial light modulator device 1. This is particularly advantageous regarding the amount of computation required for the calculation of sub-holograms and the complex-valued addition of sub-holograms in the visibility region, as explained below.

FIG. 3 shows a spatial light modulator device 10 smaller in its extent and comprising modulation elements 70 smaller in size, where the spatial light modulator device 10 is arranged closer to the visibility region 3 with respect to the distance. For the same object points P1 and P2 of the scene 4 to be reconstructed, generated sub-holograms S10 and S20 become larger in absolute terms in this exemplary embodiment with respect to the spatial light modulator device 10. As here the spatial light modulator device 10 comprises smaller modulation elements 70 (pixels) and thus has a smaller pixel pitch than that of the spatial light modulator device 10 according to FIG. 1, here the sub-holograms S10 and S20 extend over a significantly larger number of modulation elements 70. The computational effort required for calculating the entire hologram from the scene 4 to be reconstructed would, therefore, be greater in this case.

For calculating sub-holograms, the method according to the invention introduces a virtual plane of the spatial light modulator device, which is located at a physical location, in order to minimize the computational effort. In this way, it is possible to obtain fast and exact computational results, irrespective of the size and distance of the spatial light modulator device from the observer plane.

Irrespective of the actual configuration of the holographic display apparatus, in particular of the position of the spatial light modulator device and of the optical system, first, a sub-hologram is calculated in such a way as if the virtual plane of the spatial light modulator device according to FIGS. 2 and 3 were in a physical plane of the spatial light modulator device 1 or 10 and is calculated based on the physical plane of the spatial light modulator device. Then, this sub-hologram is transformed into the physical plane of the spatial light modulator device, that is, into the actually available plane of the spatial light modulator device, by means of two integral transformations, for example, by means of two Fresnel transformations, or it is transformed into the image of the spatial light modulator device, for example, onto a screen, depending on the embodiment of the holographic display apparatus.

Regarding FIGS. 2 and 3, the method according to the invention is now carried out as follows. For example, there is a configuration of the display apparatus as shown in FIG. 3, in which the spatial light modulator device 10 comprises a given number N of modulation elements 70 in an observer's distance D. For a scene 4 to be displayed or reconstructed with known coordinates of the object points P1 to $P_n$ or P10 to Pn' it is provided that, for the calculation of the individual sub-holograms S1 to $S_n$ or S10 to $S_n'$ for the individual object points or for the calculation of the entire hologram, the physical plane of the spatial light modulator device 10 is moved virtually to another position or location with respect to the scene to be reconstructed 4 such that the new apparent or only imaginary position of the physical plane of the spatial light modulator device 10, for example, is identical with the position of the physical spatial light modulator device 1 according to FIG. 2. It should be pointed out that the position of the physical plane of the spatial light modulator device 1, 10 is tight or fixed, thus not being shifted physically but only apparently or virtually. The virtual plane of the spatial light modulator device is, therefore, an imaginary size, which, although not provided physically, is provided with regard to its functionality or effect.

For the virtual plane of the spatial light modulator device 1, 10, a position is chosen advantageously with regard to the scene 4 to be reconstructed, which is within the scene 4 to be reconstructed, so that, watched by an observer in the observer plane 2, one part of the object points P1 to $P_n$, seen in the direction of propagation of light emitted by an illumination device of the display apparatus, is in front of and an other part of the object points P1 to $P_n$ is behind the virtual plane of the spatial light modulator device 1, 10, where the object points that are closest to the observer plane 2 should be located not more than half the virtual observer's distance in front of the virtual plane of the spatial light modulator device 1, 10.

However, the method is not limited to a certain definition of the position of the virtual plane of the spatial light modulator device.

The position of the virtual plane of the spatial light modulator device may move virtually, dynamically with the content of the scene to be displayed, to be able to calculate, for example, scenes with a variable depth range in an optimal way.

The virtual size of the modulation elements 7, 70 of the spatial light modulator device 1, 10 is calculated using the intercept theorem from the ratio of the observer's distances of the virtual plane and the physical plane of the spatial light modulator device multiplied by the pixel pitch of the spatial light modulator device.

For the virtual plane of the spatial light modulator device 1, 10, a sub-hologram or a hologram is calculated in such a way as would be required in the prior art, for example, according to WO 2008/025839 A1, if a spatial light modulator device were provided in this plane. This can be carried out such that for each object point P1 to $P_n$ a sub-hologram is calculated in form of a lens function, and the individual sub-holograms will then be added up coherently.

Subsequently, a one-time computational (two-dimensional) integral transformation, for example, a Fresnel transformation, of the entire hologram is carried out, which corresponds to the optical propagation of light of the virtual plane of the spatial light modulator device to the visibility region 3. Then, a further computational (two-dimensional) integral transformation is carried out, here for example, also a Fresnel transformation, which corresponds to the propagation of light from the visibility region 3 back to the physical plane of the spatial light modulator device 1, 10. An entire hologram is thus obtained, corresponding at least approximately to the hologram that, according to the prior art, is obtained by directly calculating the hologram in the physical plane of the spatial light modulator device 1, 10. The resulting hologram may then be written in or encoded into the spatial light modulator device 1, 10.

Compared to the conventional calculation, the method according to FIGS. 2 and 3 requires two additional integral transformations. On the other hand, for a large number of object points, the computational time savings, and the savings when adding up the individual sub-holograms can be more important than the two integral transformation, which are carried out only once for the entire hologram.

Figure 4:
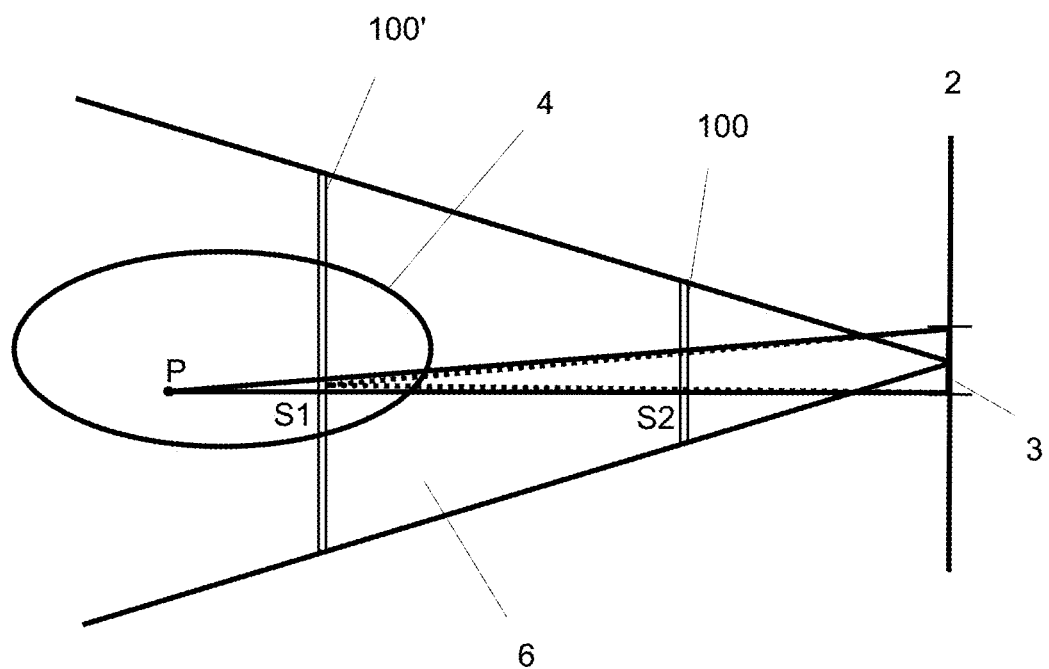
FIG. 4: a schematic drawing of the extension of sub-holograms of a preferably three-dimensional scene in analogy to a single-parallax encoding in a physical plane and a virtual plane of the spatial light modulator device.
Figure 5:
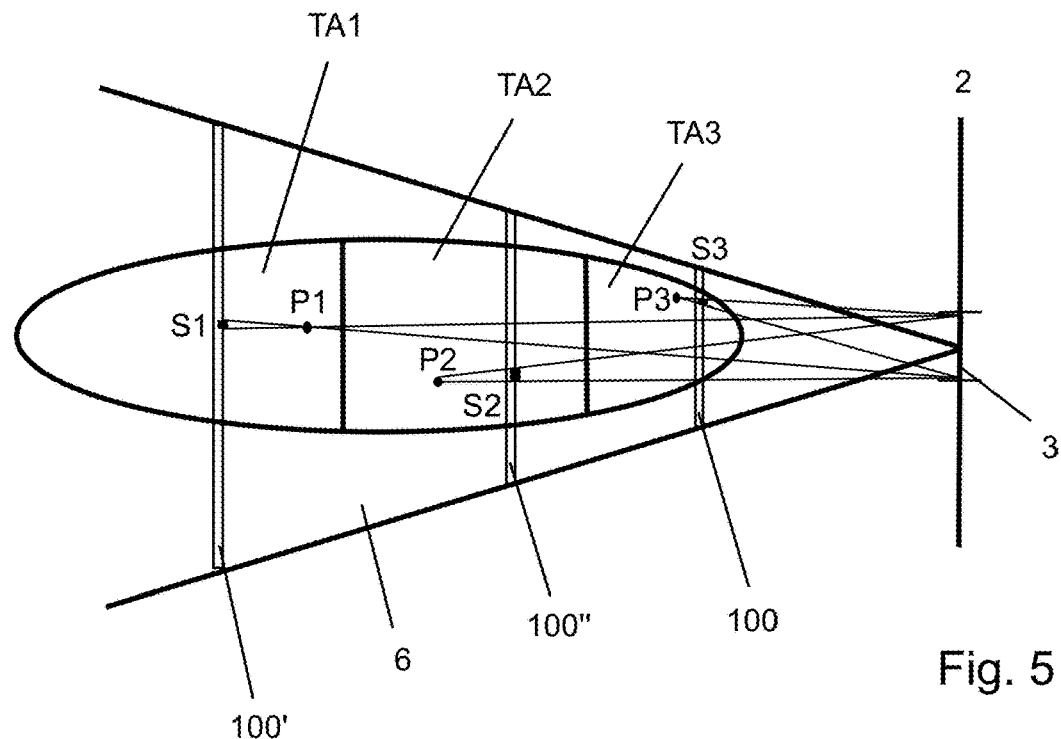
FIG. 5: a schematic drawing of the extension of sub-holograms of a preferably three-dimensional scene having an extensive depth range in a physical plane and in two virtual planes of the spatial light modulator device.
Figure 6:
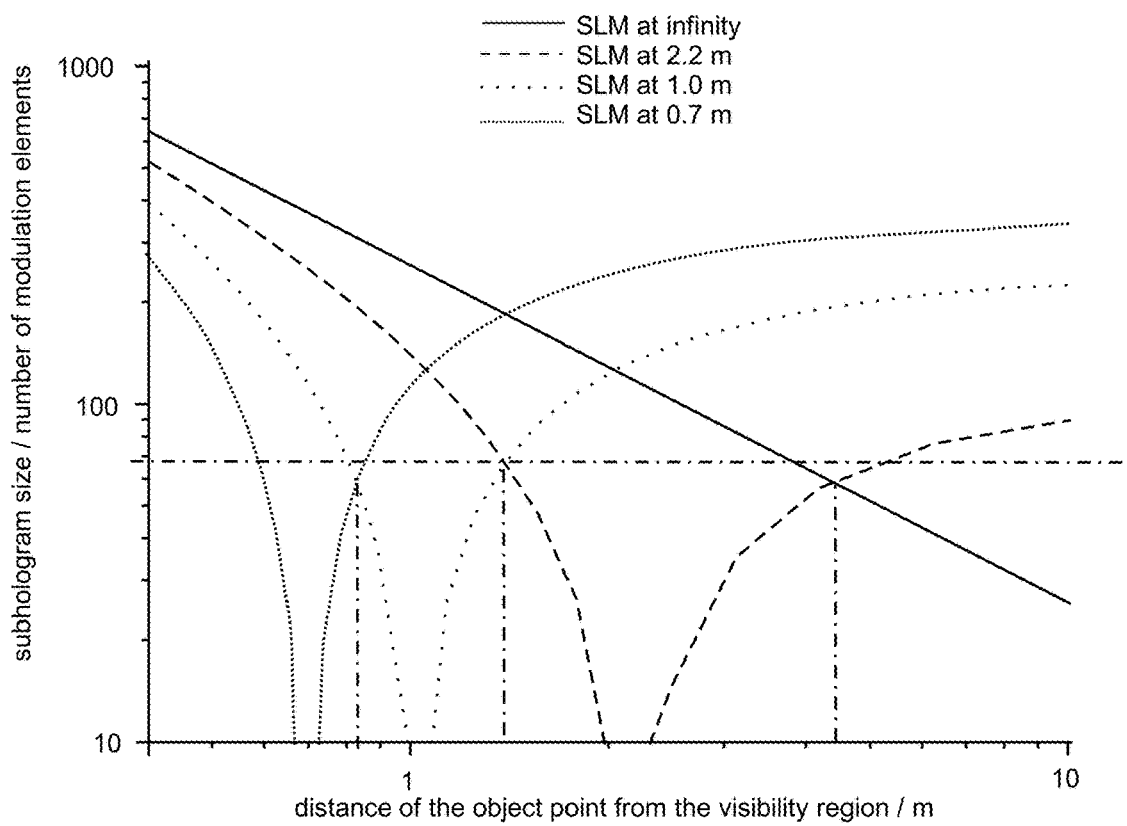
FIG. 6: a graphical representation of an embodiment for the extension of sub-holograms for different distances of the plane of the spatial light modulator device from a visibility region.

The following embodiments according to FIGS. 4 to 6 show further variants of the method according to the invention.

FIG. 4 is a schematic drawing of the extent of sub-holograms of a preferably three-dimensional scene 4 to be displayed in analogy to a single-parallax encoding in a physical plane 100 of the spatial light modulator device 100 and a virtual plane 100' of the spatial light modulator device 100. Herein, the depth range of the scene 4 to be reconstructed is represented schematically by the oval limitation. Here, the scene 4 to be reconstructed is decomposed into object points P1 to $P_n$ as well, where only one object point P is shown in FIG. 4. For the object points P1 to $P_n$, sub-holograms are calculated, for example, in analogy to a single-parallax encoding. The solid lines in FIG. 4 show schematically the light path from the object point P to the visibility region 3 in the encoding direction of one-dimensional sub-holograms S1 and S2. The dashed lines show schematically the course from the sub-hologram S1 to the visibility region 3 in the direction perpendicular to it, where the sub-hologram S1 comprises the extent of only one modulation element (pixel). For better illustration, both are drawn in the paper plane.

The one-dimensional sub-hologram S1 calculated in the virtual plane 100' of the spatial light modulator device 100 is then transformed by means of an integral transformation, for example, by means of a Fresnel transformation or a Fourier transformation, into the visibility region 3 and is then transformed from there into the physical plane 100 of the spatial light modulator device 100, where it acts as a sub-hologram extended into two dimensions. However, the focal lengths of the lens function of the sub-hologram are not identical in both directions on the physical plane 100 of the spatial light modulator device 100 (orthogonal to each other). In one direction, for example, the encoding direction of the sub-hologram on the virtual plane 100' of the spatial light modulator device 100, the focal point of the lens function is located in the plane of the object point; in the direction perpendicular to it, the focal point of the lens function is located on the virtual plane 100' of the spatial light modulator device 100.

This variant of the method can be used in a particularly advantageous way for a spatial light modulator device that is located at a smaller distance to the observer plane 2 and in which the virtual plane of the spatial light modulator device has a greater distance to the observer plane 2 than the physical plane of the spatial light modulator device according to FIG. 4.

FIG. 5 is a schematic drawing of the extent of sub-holograms of a preferably three-dimensional scene 4 to be displayed, with a broad depth range in a physical plane 100 of the spatial light modulator device 100 and in two virtual planes 100' and 100" of the spatial light modulator device 100.

Thus, FIG. 5 shows schematically the extent of sub-holograms S1, S2 and S3 of a scene 4 to be reconstructed to be displayed, with a broad depth range, which is represented here also like in FIG. 4 by the oval limitation of the scene 4 to be reconstructed, in a physical plane 100 of the spatial light modulator device 100 and in two virtual planes 100' and 100" of the spatial light modulator device 100.

According to FIG. 5, the scene 4 to be reconstructed is decomposed into three depth range sections TA1, TA2 and TA3. Each of the depth range sections TA1, TA2 and TA3 is assigned to one of the two virtual planes 100', 100" of the spatial light modulator device 100 or to the physical plane 100 of the spatial light modulator device 100. According to FIG. 5, this means here that the depth range section TA1 is assigned to the virtual plane 100' of the spatial light modulator device 100, the depth range section TA2 is assigned to the virtual plane 100" of the spatial light modulator device 100, and the depth range section TA3 is assigned to the physical plane 100 of the spatial light modulator device 100. Furthermore, all object points located in the depth range section TA1, such as the object point P1, are assigned to the virtual plane 100' of the spatial light modulator device 100;

and by means of said virtual plane the sub-holograms are then calculated for the respective object points in said depth range section TA1. All object points located in the depth range section TA2, such as the object point P2, are assigned to the virtual plane 100" of the spatial light modulator device 100, which is different from the virtual plane 100' of the spatial light modulator device 100 with respect to its position or location, and is arranged closer to the observer plane 3 here. All the remaining object points, such as the object point P3, are then assigned to the depth range section TA3, where said object points are assigned to the physical plane 100 of the spatial light modulator device 100. Then, for the virtual planes 100' and 100" of the spatial light modulator device 100 and the physical plane 100 of the spatial light modulator device 100, the individual sub-holograms, such as S1, S2 and S3 to $S_n$, are calculated to the respective object points, such as P1, P2 and P3 to $P_n$, in the respective depth range sections TA1, TA2 and TA3. In this case, the sub-holograms S1 to $S_n$ may be calculated as single-parallax sub-holograms or may also be calculated as full-parallax sub-holograms.

In a single-parallax calculation, the segmentation into virtual planes of the spatial light modulator device and the subdivision of the scene 4 to be reconstructed into several depth range sections TA1, TA2 and TA3 are carried out such that an observer can see the reconstructed two-dimensional and/or three-dimensional scene with no or with only a minor loss in resolution.

In a full-parallax calculation, the segmentation into virtual planes of the spatial light modulator device and the subdivision of the depth range of the scene 4 to be reconstructed into sections are carried out such that a maximum size of the sub-holograms is not exceeded, as explained in detail before the description of the figures.

Subsequently, the calculated sub-holograms S1, S2 and S3 or S1 to $S_n$ of the depth range sections TA1, TA2 and TA3 are transformed into the observer plane 2 or into the visibility region 3, and are added up there. Then, the summed sub-holograms or the entire hologram are transformed into the physical plane of the spatial light modulator device 100.

As shown in FIG. 5, the sub-holograms S1 and S2 for the respective object points P1 and P2 of the scene 4 to be reconstructed are smaller in their extent or size in the two virtual planes 100' and 100" of the spatial light modulator device 100 than if they had been calculated directly in the physical plane 100 of the spatial light modulator device 100.

In a graphic representation, FIG. 6 shows a numerical example of the extent of sub-holograms for different distances of the (virtual and physical) plane 100, 100', 100" of the spatial light modulator device 100 from the visibility region 3 in the observer plane 2. The distance of the object point from the visibility region is plotted on the abscissa of the displayed diagram, and the size of the sub-hologram or the number of modulation elements (pixels) described by the sub-hologram is plotted on the ordinate. Thus, for an approximately 11-mm-large visibility region, the sizes of the sub-holograms (in modulation elements [pixels] per sub-hologram) are indicated as a function of the distance of the object point from the visibility region for different distances of the spatial light modulator device from the visibility region. The example shown in the diagram should be considered only as an example here.

An object point of a scene to be reconstructed, which is 2 m away from an observer, generates, for example, a sub-hologram with a size of approximately 200×1 modulation elements (pixels) in a single-parallax encoding or a sub-hologram with a size of approximately 200×200 modulation elements in a full-parallax encoding on a spatial light modulator device (SLM), which is 0.7 m away from the visibility region in the observer plane. On a spatial light modulator device (SLM), which, however, is 2.2 m away from the visibility region in the observer plane, the extent of the sub-hologram of the same object point is only few modulation elements (pixels) in size, for example <10×1 modulation elements in a single-parallax encoding or <10× 10 modulation elements in a full-parallax encoding. The contrary applies when object points are located at a closer distance to an observer. On a spatial light modulator device at a close distance, said object points are small in their extent or size, but on a spatial light modulator device at a far distance, they are larger in their extent.

The dashed lines in the diagram according to FIG. 6 show schematically the subdivision of a scene to be reconstructed into four depth range sections. For example, the physical plane of the spatial light modulator device may be positioned at a distance of 0.7 m to the visibility region, and the virtual planes of the spatial light modulator device may be positioned at a distance of 1 m or 2.2 m to the visibility region or at infinity. Reversely, however, the physical plane of the spatial light modulator device may, for example, be positioned at a distance of 2.2 m to the visibility region, and a virtual plane of the spatial light modulator device may be positioned at a distance of 0.7 m to the visibility region. By subdividing the depth range into depth range sections, it is achieved that all sub-holograms for object points remain smaller than 70×1 modulation elements for a single-parallax encoding or 70×70 modulation elements for a full-parallax encoding at a distance approximately >62 cm to infinity from the visibility region. Without using virtual planes of the spatial light modulator device, the sub-holograms would, for example, reach an extent of up to 300×300 modulation elements in a full-parallax encoding, involving an increased computational effort.

Figure 7:
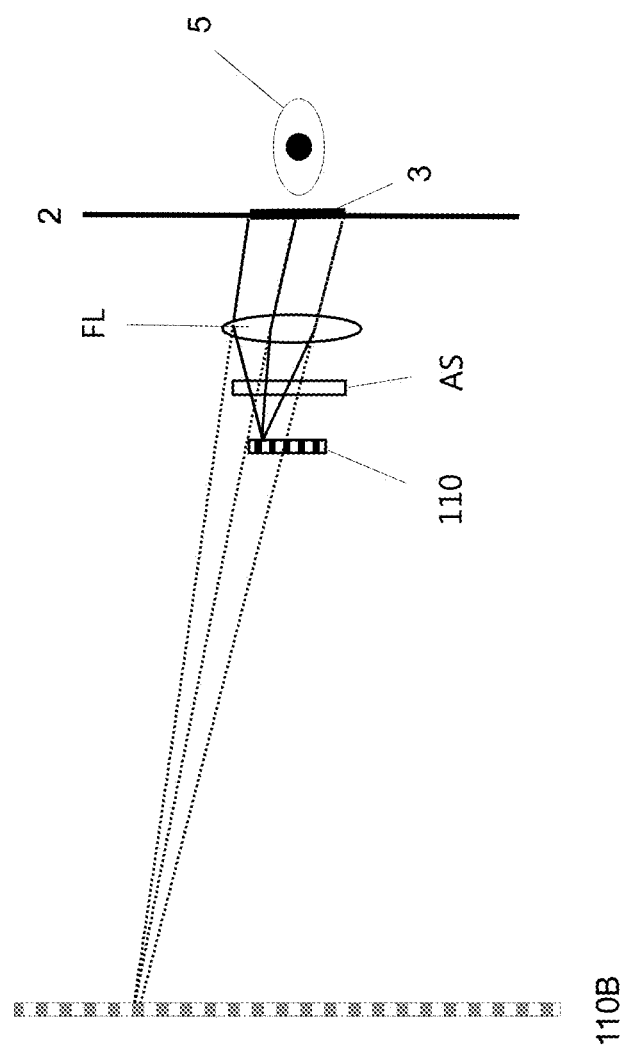
FIG. 7: a schematic drawing of a display apparatus designed as a head-mounted display.
Figure 7:
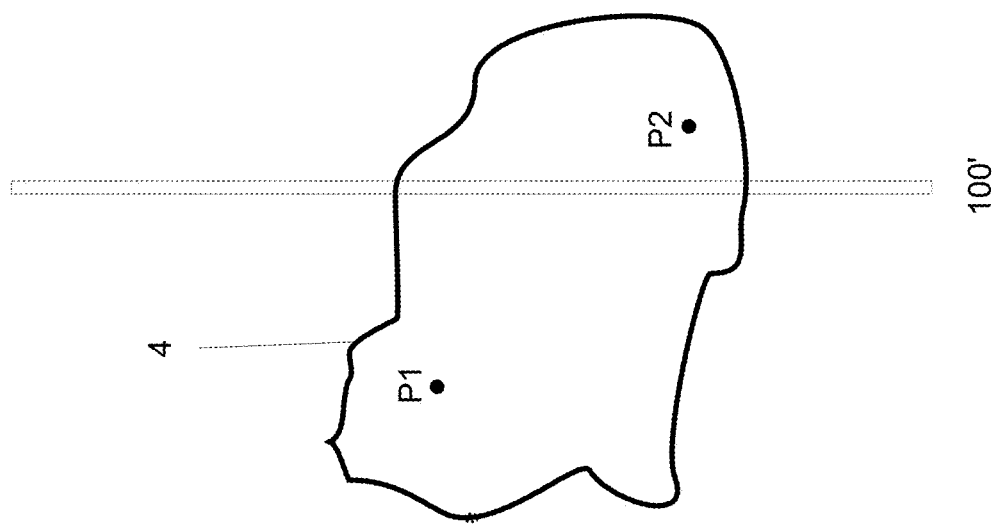

FIG. 7 shows a display apparatus for the holographic reconstruction of two-dimensional and/or three-dimensional scenes that can be used, for example, as a head-mounted display (HMD) or hocular. With regard to an HMD, usually an enlarged, virtually generated image of a spatial light modulator device is generated. As mentioned above, the physically available plane, that is, the physical plane of the spatial light modulator device can also be understood as an image plane of the spatial light modulator device within the meaning of the invention.

In FIG. 7, a light source and a collimation element, herein in form of a lens as shown, for example, in FIG. 1c, for illuminating a spatial light modulator device 110 are not illustrated for the purpose of clarity. Here, the spatial light modulator device 110 is arranged at a position in the display apparatus in such a way that the distance between the spatial light modulator device 110 and a field lens FL is similar in size—like the distance between the field lens FL and an observer plane 2. If, for example, the distance between the field lens FL and the observer plane 2 equals the focal length of the field lens FL and if the distance between the spatial light modulator device 110 and the field lens FL is slightly smaller than the focal length of the field lens FL, an enlarged virtual image of the spatial light modulator device 110 is visible from the visibility region 3. The more the distance between the spatial light modulator device 110 and the field lens FL approached the focal length of the field lens FL, the further away and more greatly enlarged would be the virtual image. Of course, other arrangements are possible as well. In particular, the field lens FL, which is simplified here, illustrated as a single lens, can also be a composite system of several lenses. In this case, the data regarding the distances of the field lens FL to the visibility region 3 and to the spatial light modulator device 110 would, for example, apply to the principal planes of the lens system.

Furthermore, light beams emanating from a modulator element (pixel) of the spatial light modulator device 110 and directed toward the center and the edges of a viewing window 3 are illustrated. The light beams are deflected by the field lens FL in such a way as if they emanated from or were emitted by an enlarged image 110B of the spatial light modulator device 110 at a greater distance. An imaging system or a focusing system AS which is, advantageously, configured to have a variable focal length herein, is provided between the spatial light modulator device 110 and the field lens FL. The focal length of the imaging system AS can thus be varied in a controllable way. Of course, the imaging system AS can also be arranged at another suitable position in the display apparatus.

If the field lens FL is a lens system comprising several lenses, the imaging system AS having a variable focal length can also be a part of the field lens FL or the field lens FL itself can be designed as an imaging system or a focusing system AS having a variable focal length. The imaging system or the focusing system AS having a variable focal length can, for example, also be designed as a system of several lenses in which the distance of the individual lenses to each other can be varied, whereby the focal length of the entire system is changed.

Furthermore, FIG. 7 shows a three-dimensional scene 4 to be reconstructed, which is illustrated as an example only and which, in this embodiment, is located at a relatively great distance behind an image 110B of the spatial light modulator device 110. For example, the image of the spatial light modulator device 110 is located at a distance of 0.7 m to the visibility region 3. The three-dimensional scene 4, however, is located at a distance of more than 2.5 m from the visibility region 3. The scene 4 to be reconstructed is decomposed into individual object points P1-Pn in order to calculate holograms to be encoded into the spatial light modulator device 110.

For calculating the holograms for an HMD or hocular, a virtual plane 110' of the spatial light modulator device 110 is determined based on the content of the scene 4 to be reconstructed and is set in the display apparatus at a position in such a way that a size suitable for the calculation of the sub-holograms results or is achieved. For example, as described above, the virtual plane 110' can be set such that either the maximum size or the average size of the sub-holograms is minimized. According to FIG. 7, the virtual plane 110' is arranged or set here within the scene 4 to be reconstructed in such a way that a part of the object points P1-Pn are in front of and a part of the object points P1-Pn are behind the virtual plane 110'. FIG. 7 shows the imaging system AS having a variable focal length in the non-controlled state or in the variable mode or off mode.

Figure 8:
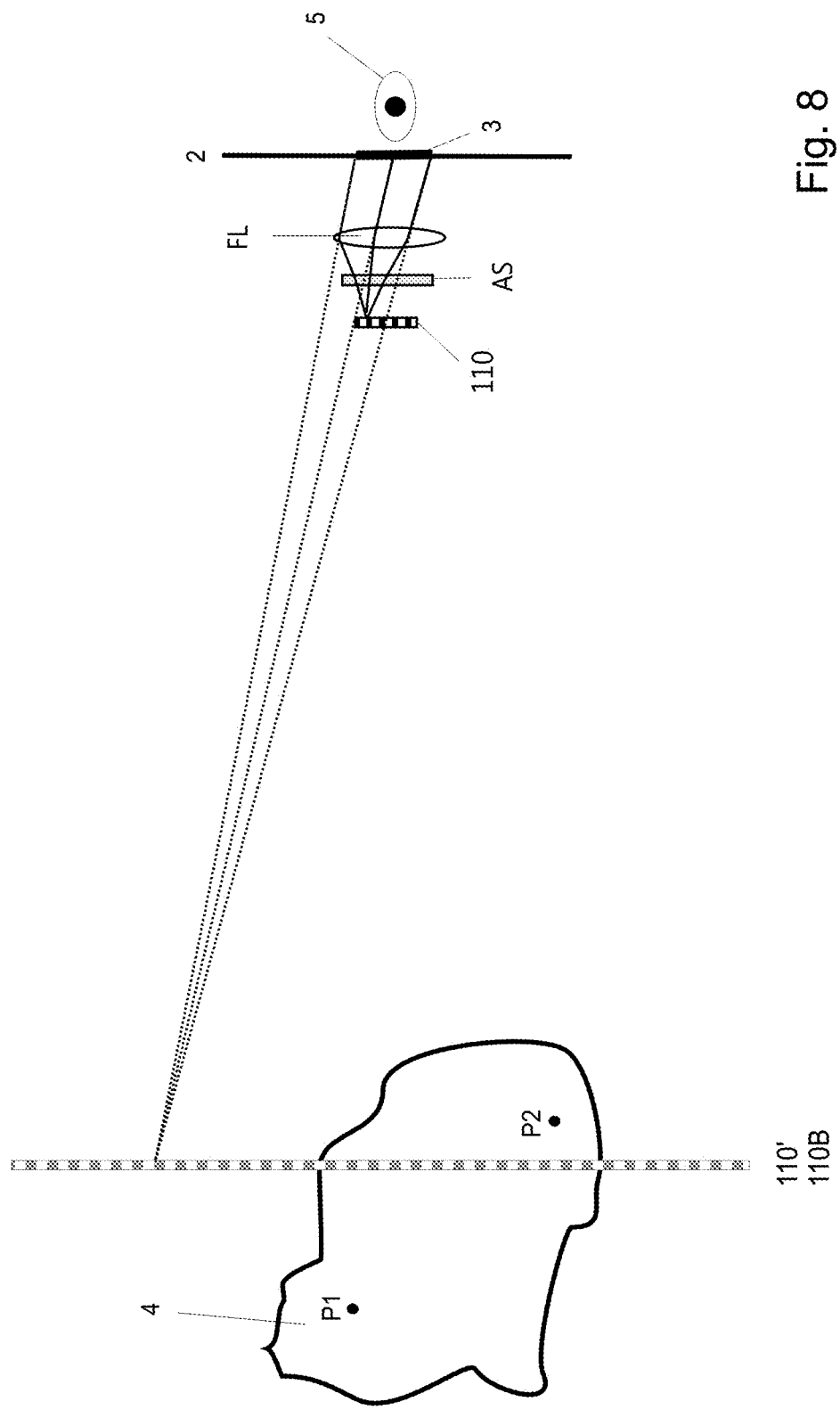
FIG. 8: the display apparatus according to FIG. 6, in which the image plane of the spatial light modulator device is shifted.

In FIG. 8, the display apparatus according to FIG. 7 is shown, where in this embodiment the imaging system AS having a variable focal length is controlled in such a way that the image plane 110B of the spatial light modulator device 110 has been shifted such that said image plane 110B coincides with the virtual plane 110' of the spatial light modulator device 110. In said plane 110B or 110' of the spatial light modulator device 110, the sub-holograms of the individual object points P1-Pn are then calculated, added up and encoded into the spatial light modulator device 110.

It is also possible to generate and determine not only one virtual plane of the spatial light modulator device but a multitude thereof, i.e., at least two virtual planes. The image of the spatial light modulator device can then be shifted into a suitable virtual plane, where the calculating and encoding of the sub-holograms into the spatial light modulator device can be carried out according to one of the many methods according to the invention described above. In the case of at least two virtual planes, it is furthermore possible to shift the image of the spatial light modulator device sequentially first into one virtual plane and then into another virtual plane.

Particularly for dynamic hologram content, in which the depth range of the preferably three-dimensional scene to be reconstructed changes, the shifting of the image 110B of the spatial light modulator device 110 into the respective virtual plane 110' of the spatial light modulator device 110 may be adjusted to the respective depth range of the scene of the frame to be displayed.

By subdividing the scene to be reconstructed and displayed into depth range sections and using virtual planes of the spatial light modulator device, the computational effort required for calculating the sub-holograms is significantly reduced and thus there is a significant time improvement when displaying reconstructed scenes.

In contrast, there is an additional effort involved in transforming the sub-hologram data from several virtual planes of the spatial light modulator device into the visibility region, adding it up there and subsequently transforming it into the physical plane of the spatial light modulator device. The total computational effort is reduced by the use of virtual planes of the spatial light modulator device and by positioning said virtual planes in a suitable way.

In this way, the advantages of the calculation methods with regard to the integral transformations and the direct calculation of sub-holograms may be combined.

The invention is not limited to the exemplary embodiments disclosed herein, and it can be used to minimize the computational effort for computer-generated holograms.

In conclusion, it shall explicitly be pointed out that the exemplary embodiments described above serve only to describe the teaching claimed, but do not limit it to the exemplary embodiments.

The invention claimed is:

1. A method for calculating holograms for the holographic reconstruction of two-dimensional and/or three-dimensional scenes in a display apparatus, comprising
   decomposing a scene to be reconstructed into object points and encoding the object points as sub-holograms into at least one spatial light modulator device of the display apparatus, where a reconstructed scene is observed from a visibility region;
   determining at least one virtual plane of the at least one spatial light modulator device based on a real or physical plane of the spatial light modulator device,
   carrying out a calculation of sub-holograms in the at least one virtual plane of the at least one spatial light modulator device, and
   depending on the position of all object points of the scene to be reconstructed, the distance of the at least one virtual plane of the spatial light modulator device to the visibility region is selected such that the average size, preferably averaged over all object points, in form of a number of modulation elements of the sub-holograms to be calculated for the scene to be reconstructed takes a minimum value.

2. The method according to claim 1, wherein the object points of the scene to be reconstructed are calculated as sub-holograms in the at least one virtual plane of the at least one spatial light modulator device, the calculated sub-holograms are transformed from the at least one virtual plane of the at least one spatial light modulator device into the visibility region by means of an integral transformation and are added up there, and the summed sub-holograms are transformed from the visibility region into the physical plane of the at least one spatial light modulator device by means of a further integral transformation and are written in as a hologram.

3. The method according to claim 1, wherein the object points of the scene to be reconstructed are calculated as sub-holograms in the at least one virtual plane of the at least one spatial light modulator device and the sub-holograms are added up in the at least one virtual plane, the summed sub-holograms of the at least one virtual plane of the at least one spatial light modulator device are transformed into the visibility region by means of an integral transformation and are transformed from the visibility region into the physical plane of the at least one spatial light modulator device by means of a further integral transformation and are written in as a hologram.

4. The method according to claim 3, wherein when at least two virtual planes of the at least one spatial light modulator device are determined, one of these virtual planes is each assigned to the object points of the scene to be reconstructed and the object points are calculated as sub-holograms in the virtual plane assigned to them and the sub-holograms of the object points assigned to the virtual plane are added up in each virtual plane, the summed sub-holograms are transformed from the at least two virtual planes into the visibility region by means of an integral transformation, the transforms of the at least two virtual planes are added up in the visibility region, and the total result of the summed transforms is transformed from the visibility region into the physical plane of the at least one spatial light modulator device by means of a further integral transformation and is written in as a hologram.

5. The method according to claim 3, wherein when at least two virtual planes of the at least one spatial light modulator device are determined, one of these virtual planes is each assigned to the object points of the scene to be reconstructed and the object points are calculated as sub-holograms in the virtual plane assigned to them and the sub-holograms of the object points assigned to the virtual plane are added up in each virtual plane, the summed sub-holograms are transformed from the at least two virtual planes into the visibility region by means of an integral transformation, for each of the at least two virtual planes the corresponding transform is transformed from the visibility region into the real or physical plane of the at least one spatial light modulator device by means of a further integral transformation, the transforms of the at least two virtual planes are added up in the physical plane of the at least one spatial light modulator device, and the total result of the summed transforms is written in as a hologram.

6. The method according to claim 1, wherein the transformation of the sub-holograms or the summed sub-holograms from a virtual plane into the visibility region or the further integral transformation from the visibility region into the physical plane of the spatial light modulator device is carried out by means of a one-dimensional integral transformation in the case of a single-parallax encoding or by means of a two-dimensional integral transformation in the case of a single-parallax encoding or a full-parallax encoding.

7. The method according to claim 1, wherein the position of the at least one virtual plane of the spatial light modulator device is selected within the depth range of the scene to be reconstructed, where the depth range of the scene to be reconstructed is delimited by the object point having the smallest distance to the visibility region and the object point having the greatest distance to the visibility region.

8. The method according to claim 1, wherein with respect to the depth range of the scene to be reconstructed, the position of the at least one virtual plane of the spatial light modulator device is selected such that the visible resolution during the reconstruction of the scene does not fall below a given value.

9. The method according to claim 1, wherein the scene to be reconstructed is decomposed into at least two depth range sections, where one virtual plane of the spatial light modulator device is each assigned to the at least two depth range sections and the sub-holograms in the virtual plane assigned to the depth range section are calculated for all object points located within a depth range section.

10. The method according to claim 9, wherein one virtual plane of the virtual planes of the spatial light modulator device, which are assigned to the at least two depth range sections, coincides with the physical plane of the spatial light modulator device.

11. The method according to claim 10, wherein the adding up of the sub-holograms calculated for the physical plane of the spatial light modulator device is carried out either in the physical plane of the spatial light modulator device or in the visibility region.

12. The method according to claim 1, wherein the individual object points of the scene to be reconstructed are encoded in form of sub-holograms on the physical plane of the spatial light modulator device as a lens element having different focal lengths in the horizontal direction and the vertical direction.

13. The method according to claim 1, wherein the calculation of the sub-holograms in the at least one virtual plane of the spatial light modulator device is carried out by means of a two-dimensional full-parallax encoding or by means of a one-dimensional single-parallax encoding.

14. The method according to claim 1, wherein depending on the depth range of the scene to be reconstructed, the number of the virtual planes of the spatial light modulator device as well as the distance of said virtual planes of the spatial light modulator device to the visibility region are selected such that the size in form of a number of modulation elements of the sub-holograms to be calculated for the scene to be reconstructed does not exceed a given value.

15. The method according to claim 1, wherein the number of the virtual planes of the spatial light modulator device is limited to a given value.

16. The method according to claim 1, wherein the position of the at least one virtual plane of the spatial light modulator device is adjusted to the new depth range when there is a change in time of the depth range of the scene to be reconstructed.

17. The method according to claim 1, wherein when tracking the visibility region in the axial direction and/or lateral direction according to a detected position of an observer of the reconstructed scene, the number and position of the at least one virtual plane of the spatial light modulator device are adjusted to the new position of the visibility region.

18. The method according to claim 1, wherein the deviation of the calculated hologram of the scene to be reconstructed by means of the at least one virtual plane of the spatial light modulator device from a hologram calculated directly in the physical plane of the spatial light modulator device for the same scene does not exceed a defined criterion.

19. The method according to claim 1, wherein when using a display apparatus for two-dimensional and/or three-dimensional scenes in which an image plane of the at least one spatial light modulator device is generated, which acts as a physical plane of the spatial light modulator device, at least one virtual plane of the at least one spatial light modulator device is determined depending on the content of a scene to be reconstructed, and the image plane of the spatial light modulator device is shifted such that said image plane coincides with the virtual plane of the spatial light modulator device, the object points of the scene to be reconstructed are calculated as sub-holograms and added up and are written in as a hologram.

20. A display apparatus, in particular a holographic display apparatus for the representation of two-dimensional and/or three-dimensional scenes, comprising a spatial light modulator device, where the light modulator device is suitable for carrying out the method according to claim 1.

21. The display apparatus according to claim 20, wherein the display apparatus comprises an image plane of the spatial light modulator device and an imaging system, where the imaging system is designed such that the position of the image plane is variable.

22. The display apparatus according to claim 21, wherein the imaging system comprises at least one element having a variable focal length.

23. The display apparatus according to claim 20, wherein the display apparatus is designed as a head-mounted display.

\* \* \* \* \*